(12) United States Patent
Yamada

(10) Patent No.: US 7,161,742 B2
(45) Date of Patent: Jan. 9, 2007

(54) SMALL ZOOM LENS, AND DIGITAL CAMERA AND VIDEO CAMERA BOTH HAVING SAME

(75) Inventor: Katsu Yamada, Matsubara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/541,744

(22) PCT Filed: Mar. 8, 2004

(86) PCT No.: PCT/JP2004/002987

§ 371 (c)(1),
(2), (4) Date: Jul. 8, 2005

(87) PCT Pub. No.: WO2004/081631

PCT Pub. Date: Sep. 23, 2004

(65) Prior Publication Data

US 2006/0146420 A1   Jul. 6, 2006

(30) Foreign Application Priority Data

Mar. 14, 2003  (JP) .............................. 2003-070824

(51) Int. Cl.
*G02B 15/14* (2006.01)
(52) U.S. Cl. ........................................ 359/687; 359/688
(58) Field of Classification Search ......... 359/686–688
See application file for complete search history.

(56) References Cited

U.S. PATENT DOCUMENTS 5,583,698 A   12/1996  Yamada et al.

6,178,049 B1   1/2001  Mukaiya et al.
6,344,932 B1 *  2/2002  Horiuchi ...................... 359/687
6,763,186 B1 *  7/2004  Hamano ...................... 359/687

FOREIGN PATENT DOCUMENTS

| JP | 6-347697   | 12/1994 |
| JP | 2000-121940 | 4/2000  |
| JP | 2000-305016 | 11/2000 |
| JP | 2000-347103 | 12/2000 |
| JP | 2001-51196  | 2/2001  |

(Continued)

*Primary Examiner*—Ricky Mack
*Assistant Examiner*—William Choi
(74) *Attorney, Agent, or Firm*—Hamre, Schumann, Mueller & Larson, P.C.

(57) ABSTRACT

A first lens group (G1) fixed with respect to the image plane includes a lens (11) having a negative refractive power, a lens (12) having a positive refractive power and a lens (13) having a positive refractive power. A second lens group (G2) has a negative refractive power as a whole, and causes a zooming action when moved along the optical axis. An aperture stop is fixed with respect to the image plane. A third lens group (G3) includes a lens (31) having a negative refractive power and a lens (32) having a positive refractive power, has a positive or negative refractive power as a whole, and is fixed with respect to the direction of the optical axis when zooming and when focusing. A fourth lens group (G4) has a positive refractive power as a whole, and moves along the optical axis such that the image plane, which is displaced by a movement of the second lens group (G2) along the optical axis and by a movement of the object, is maintained at a constant position with respect to a reference plane. Thus, it is possible to realize a compact and high-image quality small zoom lens that is suitable for three-CCDs.

13 Claims, 21 Drawing Sheets

FOREIGN PATENT DOCUMENTS

| | | |
|---|---|---|
| JP | 2001-66717 | 3/2001 |
| JP | 2001-116996 | 4/2001 |
| JP | 2001-228394 | 8/2001 |
| JP | 2002-131638 | 5/2002 |

\* cited by examiner

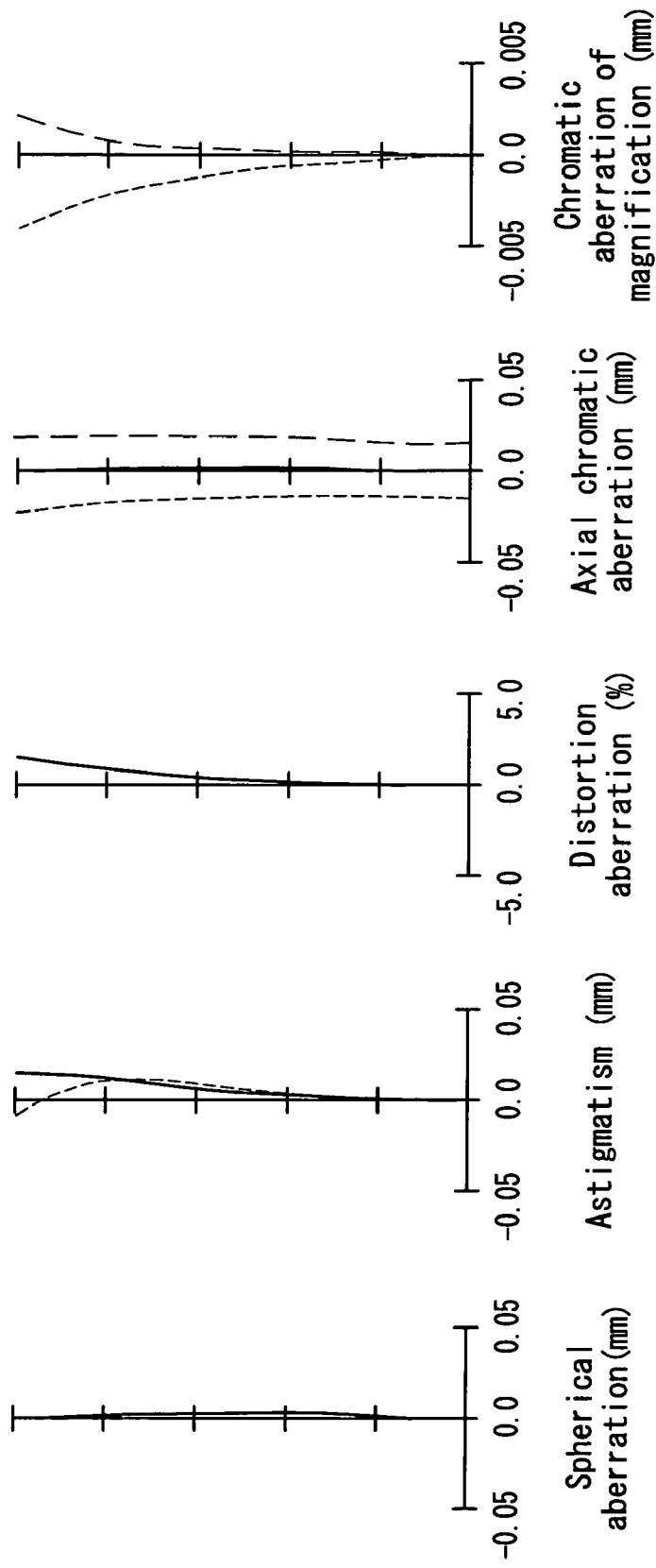
FIG. 3A Spherical aberration (mm)
FIG. 3B Astigmatism (mm)
FIG. 3C Distortion aberration (%)
FIG. 3D Axial chromatic aberration (mm)
FIG. 3E Chromatic aberration of magnification (mm)

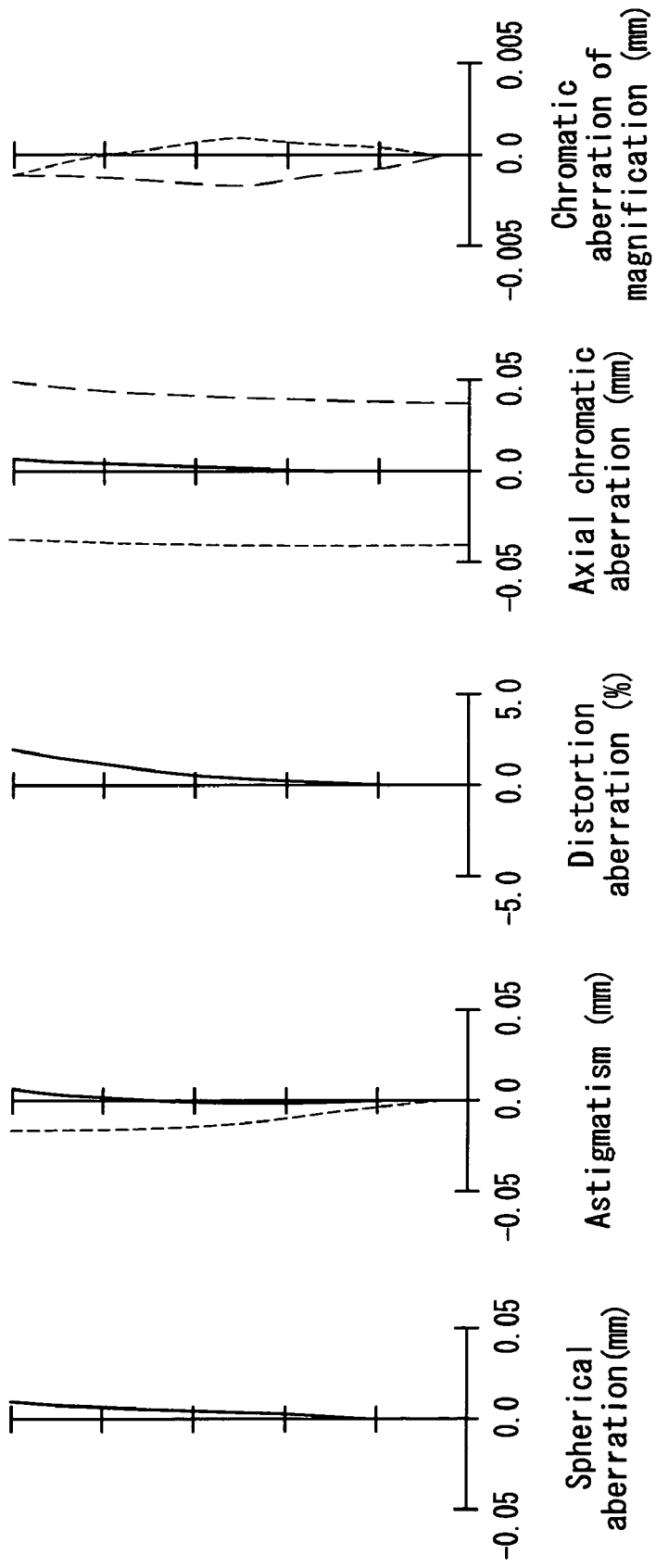

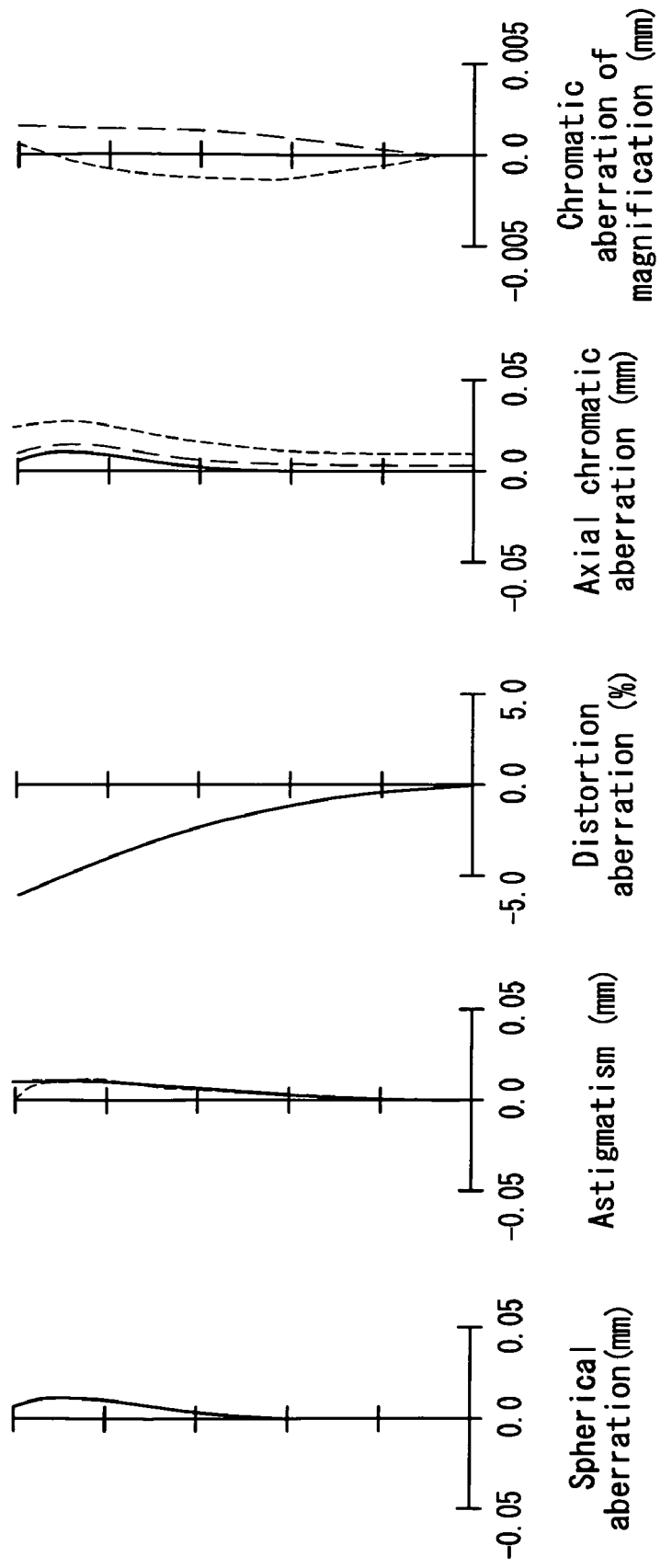

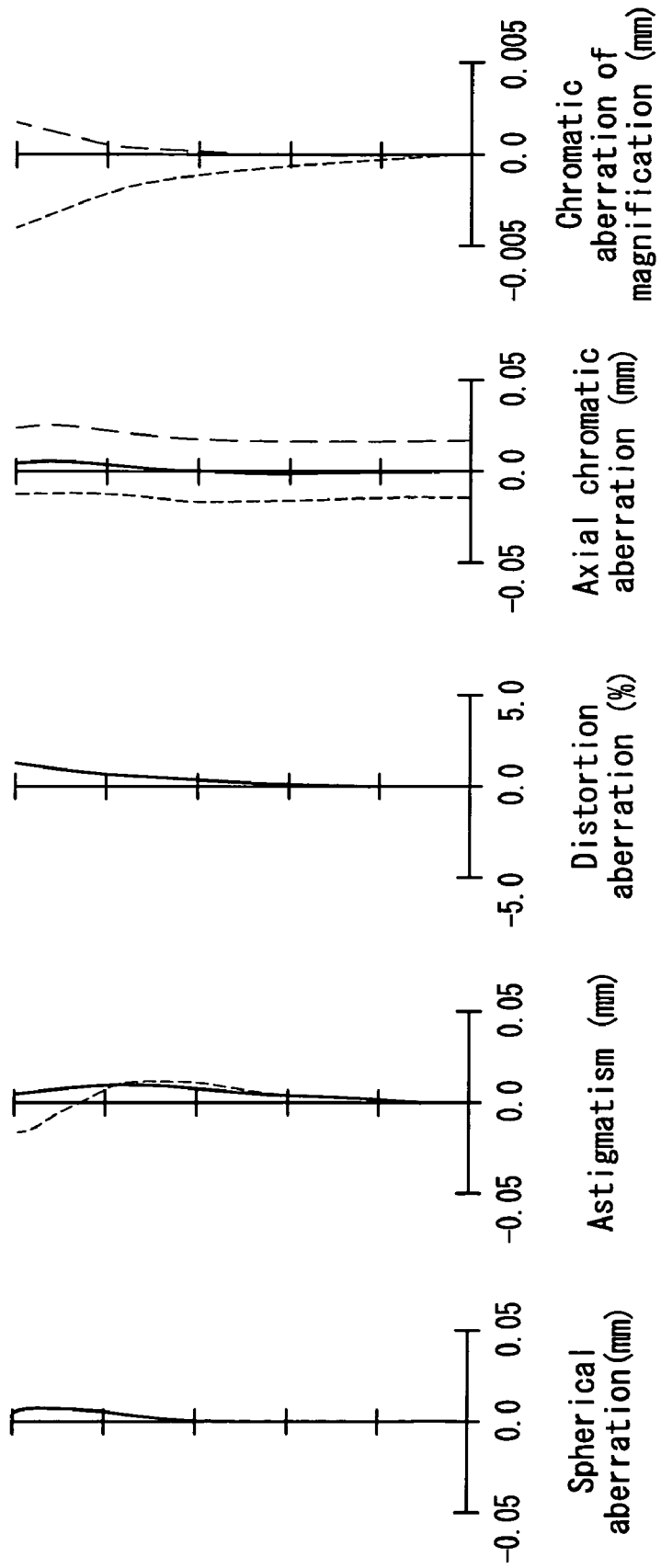

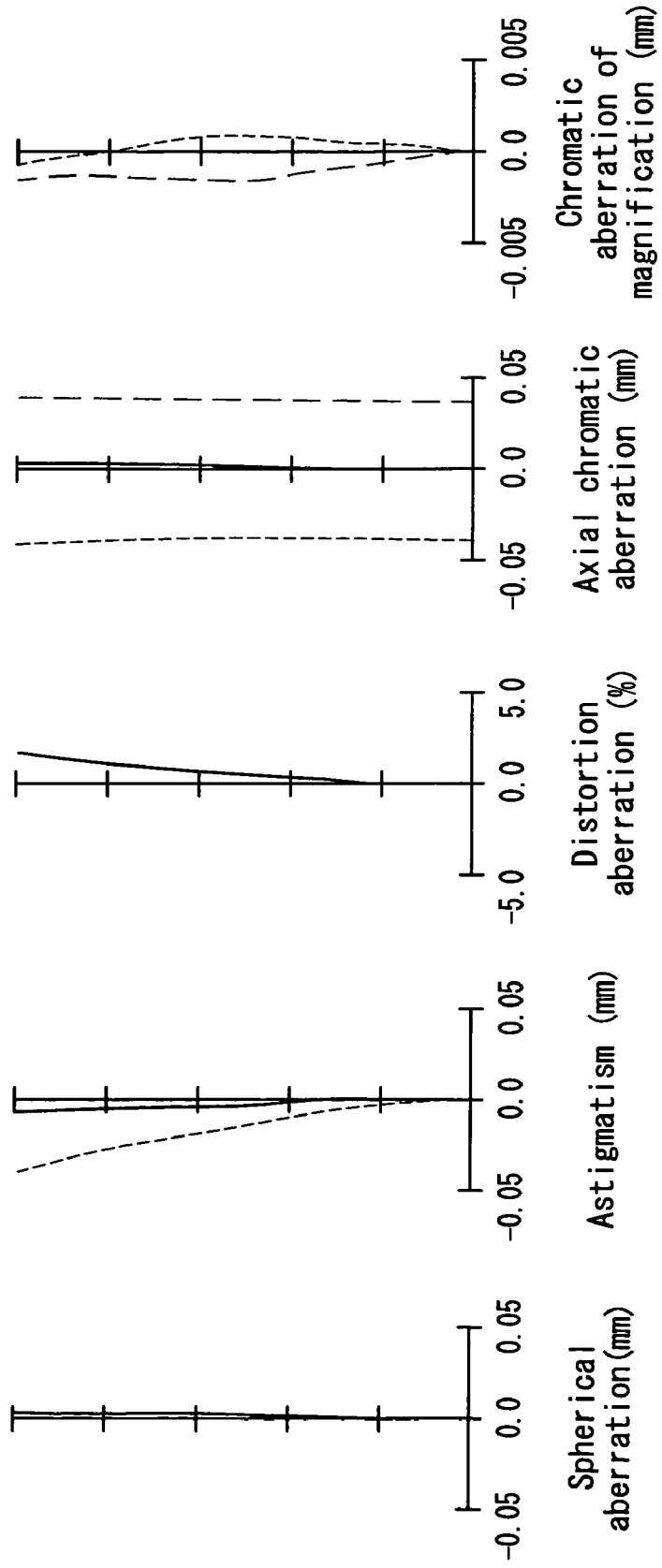

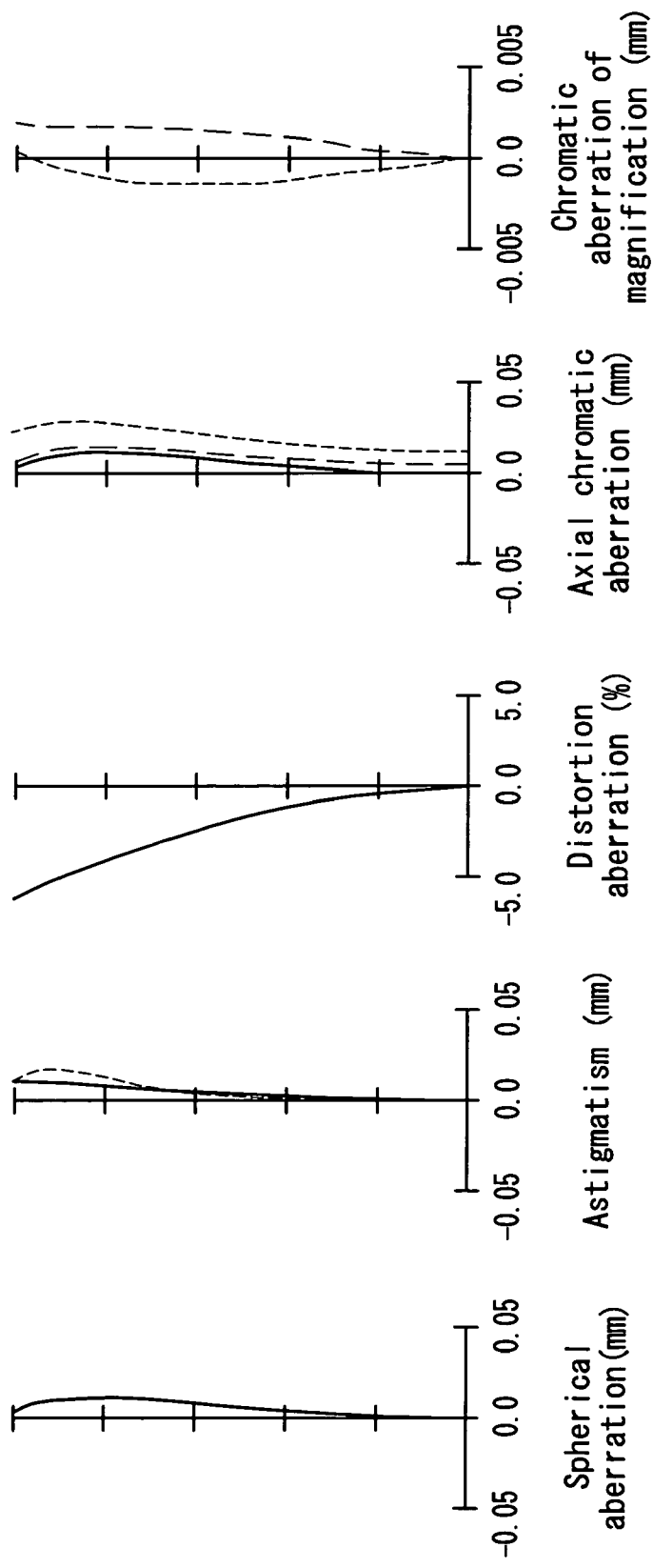

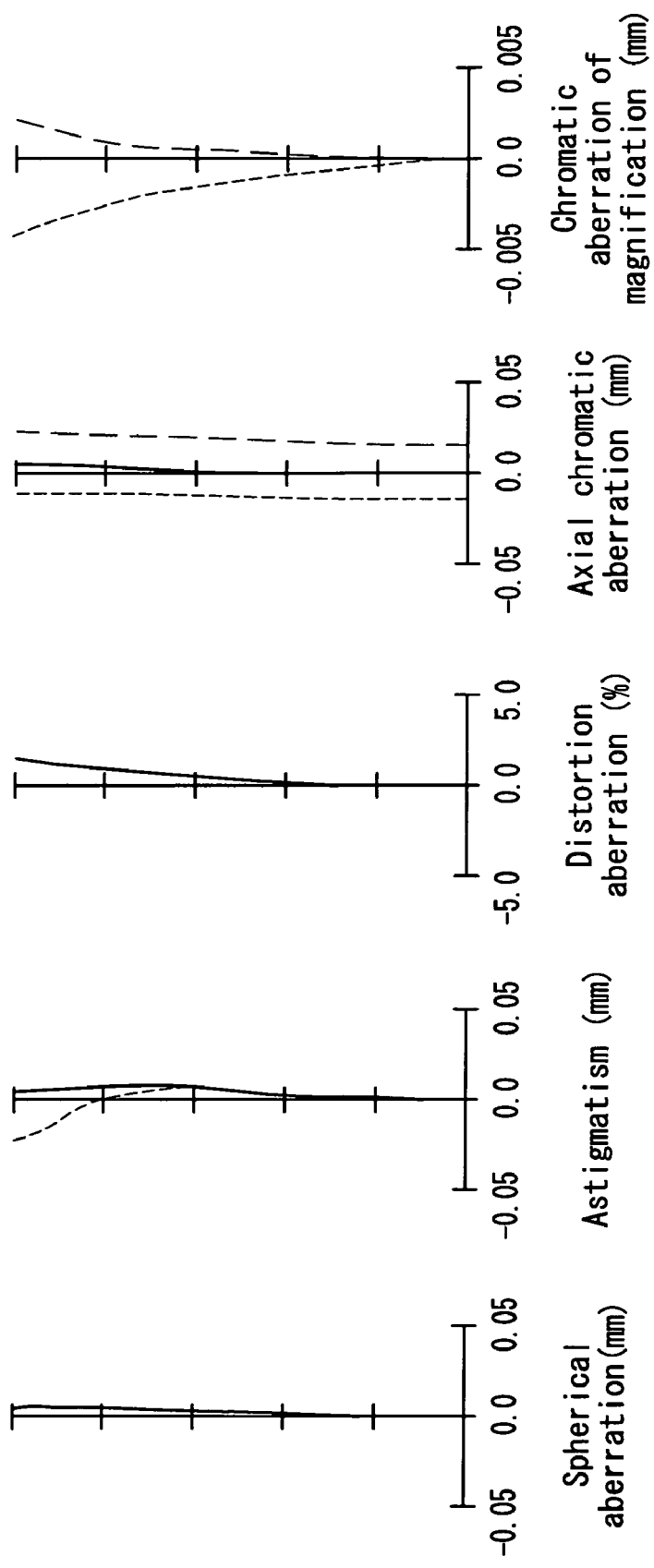

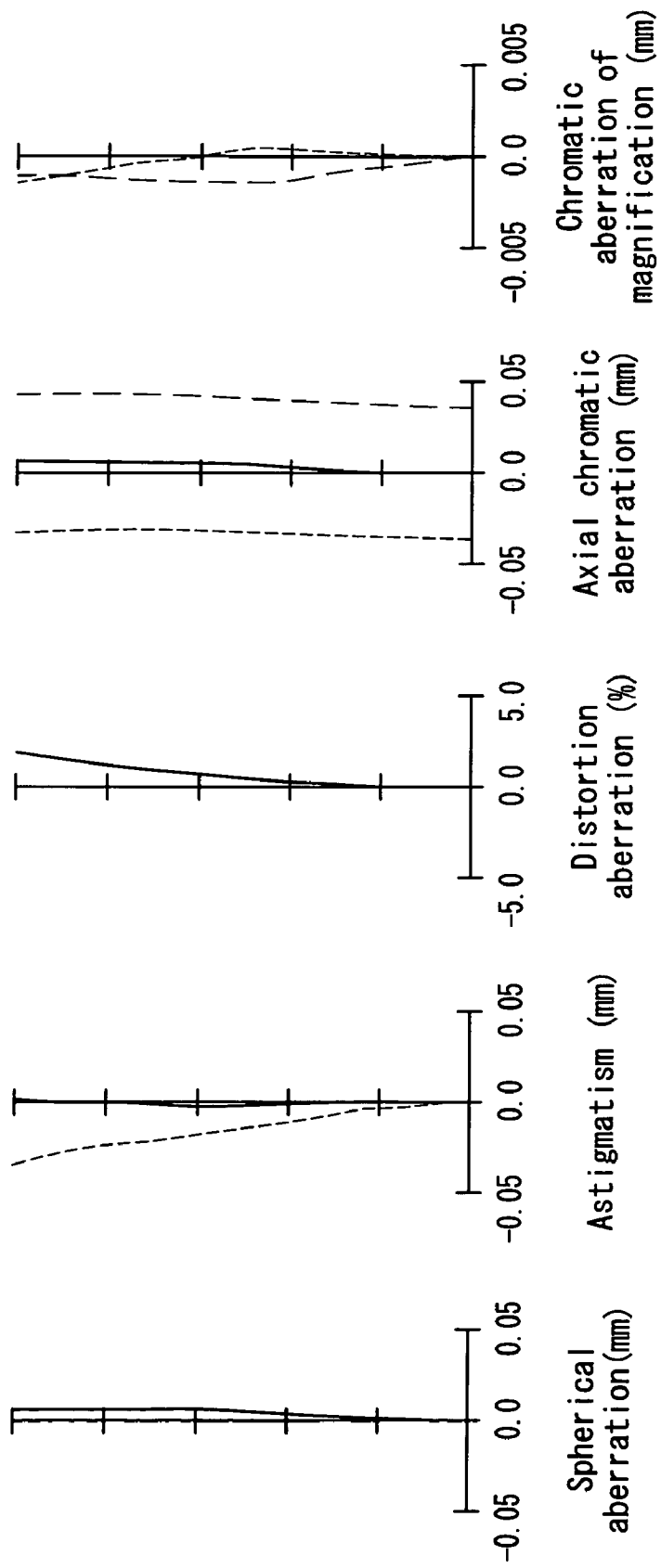

FIG. 13A Spherical aberration (mm)
FIG. 13B Astigmatism (mm)
FIG. 13C Distortion aberration (%)
FIG. 13D Axial chromatic aberration (mm)
FIG. 13E Chromatic aberration of magnification (mm)

FIG. 19A Spherical aberration (mm)
FIG. 19B Astigmatism (mm)
FIG. 19C Distortion aberration (%)
FIG. 19D Axial chromatic aberration (mm)
FIG. 19E Chromatic aberration of magnification (mm)

SMALL ZOOM LENS, AND DIGITAL CAMERA AND VIDEO CAMERA BOTH HAVING SAME

TECHNICAL FIELD

The present invention relates to small zoom lenses that can be used suitably for ultrasmall optical systems for three CCDs that acre used for video cameras and the like. The invention also relates to digital cameras and video cameras using such small zoom lenses.

BACKGROUND ART

Conventionally, high-image quality optical systems for three CCDs have been proposed.

For example, the zoom lens disclosed in JP H6(1994)-347697A is constituted by four lens groups having a positive, a negative, a positive and a positive refractive power, as viewed from the object side, and performs zooming with the second lens group and focusing with the fourth lens group. Further, the third lens group is constituted by a single lens including an aspherical surface.

Similarly, the zoom lens disclosed in JP2000-305016A is constituted by four lens groups having a positive, a negative, a positive and a positive refractive power, as viewed from the object side, and performs zooming with the second lens group and focusing with the fourth lens group.

However, in order to ensure a back focus for inserting color separation prisms, and to shorten the focal length at the same time, it is necessary to weaken the refractive power of the third lens group. When the third lens group is constituted by a single lens as in JP H6(1994)-347697A, the curvatures of the lens surfaces are reduced with decreasing refractive power, so that it is not possible to perform the aberration correction sufficiently. Or, the curvature of the surface on the object side and that of the surface on the image side become close extremely, thus making it difficult to perform processing such as centering. In JP2000-305016A, the third lens group is constituted by two lenses, so that the processing limitations can be reduced. However, the first lens group is constituted by three single lenses and therefore is difficult to be assembled, and the second lens group is constituted by four single lenses, so that it is not possible to reduce the cost.

DISCLOSURE OF INVENTION

The present invention has been made in order to solve the above-described problems, and it is an object of the invention to provide a compact, high-image quality small zoom lens that is suitable for three CCDs.

In order to achieve the above-described object, a small zoom lens according to the present invention is provided with a first lens group that includes a lens having a negative refractive power, a lens having a positive refractive power and a lens having a positive refractive power, arranged in that order from an object side, that has a positive refractive power as a whole, and that is fixed with respect to an image plane; a second lens group that has a negative refractive power as a whole, and that causes a zooming action when moved along an optical axis; an aperture stop that is fixed with respect to the image plane; a third lens group that includes a lens having a positive refractive power and a lens having a negative refractive power, that has a positive or negative refractive power as a whole, and that is fixed with respect to a direction of the optical axis when zooming and when focusing; and a fourth lens group that has a positive refractive power as a whole, and that moves along the optical axis such that the image plane, which is displaced by a movement of the second lens group along the optical axis and by a movement of the object, is maintained at a constant position with respect to a reference plane.

Furthermore, a digital camera and a video camera according to the present invention each include the above-described small zoom lens of the present invention.

BRIEF DESCRIPTION OF DRAWINGS

FIGS. 3A to 3E are aberration charts for the small zoom lens according to Working Example 1 of the present invention at the standard position.

FIGS. 4A to 4E are aberration charts for the small zoom lens according to Working Example 1 of the present invention at the telephoto end.

FIGS. 5A to 5E are aberration charts for a small zoom lens according to Working Example 2 of the present invention at the wide-angle end.

FIGS. 6A to 6E are aberration charts for the small zoom lens according to Working Example 2 of the present invention at the standard position.

FIGS. 7A to 7E are aberration charts for the small zoom lens according to Working Example 2 of the present invention at the telephoto end.

FIGS. 8A to 8E are aberration charts for a small zoom lens according to Working Example 3 of the present invention at the wide-angle end.

FIGS. 9A to 9E are aberration charts for the small zoom lens according to Working Example 3 of the present invention at the standard position.

FIGS. 10A to 10E are aberration charts for the small zoom lens according to Working Example 3 of the present invention at the telephoto end.

BEST MODE FOR CARRYING OUT THE INVENTION

Figure 1:
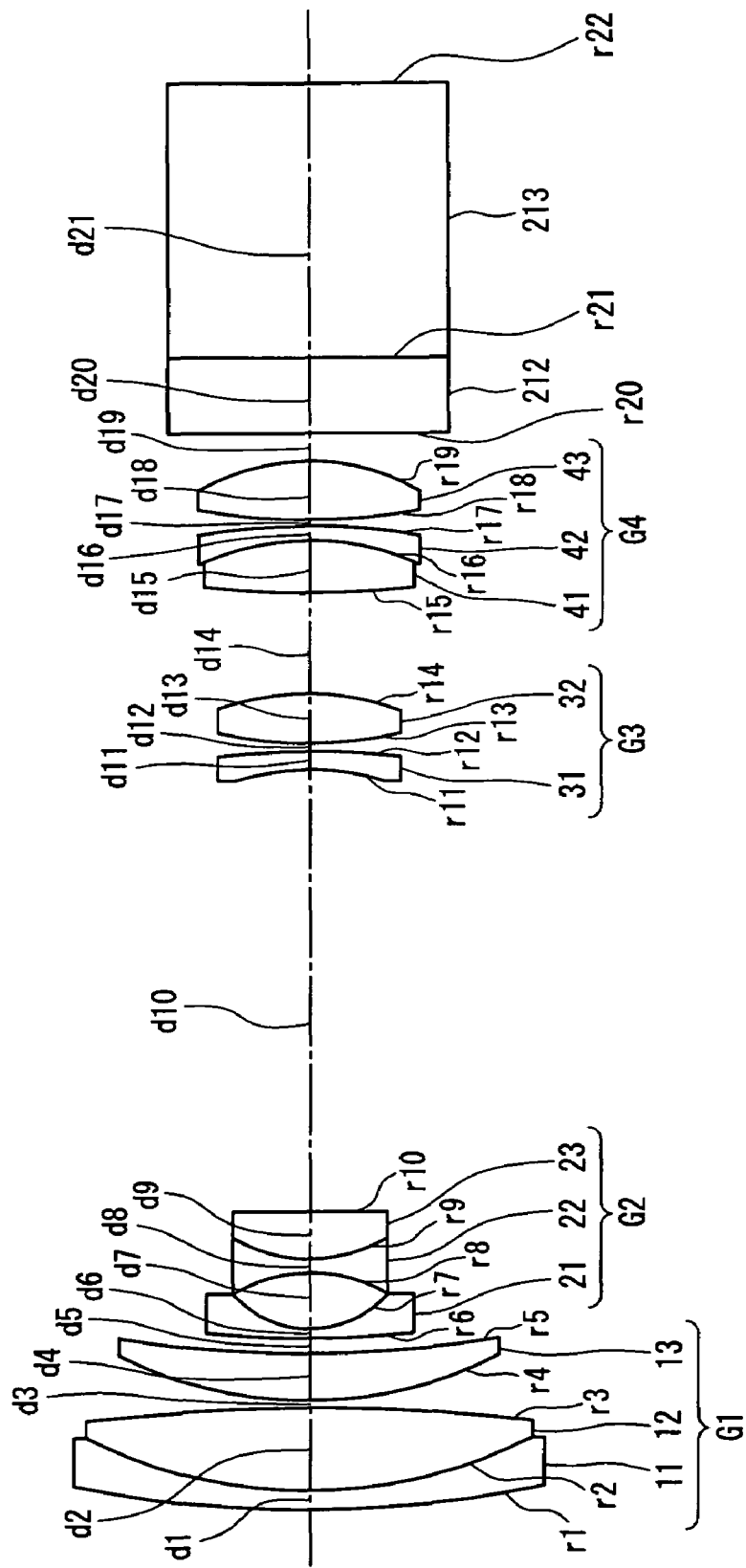
FIG. 1 is a diagram showing the configuration of a small zoom lens according to Embodiment 1 of the present invention.

A zoom lens according to the present invention is provided with a first lens group, a second lens group, an aperture stop, a third lens group and a fourth lens group, arranged in that order from an object side.

The first lens group includes a lens having a negative refractive power, a lens having a positive refractive power and a lens having a positive refractive power, arranged in that order from the object side, has a positive refractive power as a whole, and is fixed with respect to the image plane.

The second lens group has a negative refractive power as a whole, and causes a zooming action when moved along the optical axis.

The aperture stop is fixed with respect to the image plane.

The third lens group includes a lens having a positive refractive power and a lens having a negative refractive power, has a positive or negative refractive power as a whole, and is fixed with respect to the direction of the optical axis when zooming and when focusing.

The fourth lens group has a positive refractive power as a whole, and moves along the optical axis such that the image plane, which is displaced by a movement of the second lens group along the optical axis and by a movement of the object, is maintained at a constant position with respect to a reference plane.

With the above-described configuration, it is possible to realize a high-image quality small zoom lens that can be used suitably for three CCDs.

In the above-described zoom lens of the present invention, it is preferable that the second lens group includes at least one aspherical surface, and includes a meniscus negative lens whose convex surface faces the object side, a lens having a negative refractive power and a lens having a positive refractive power, arranged in that order from the object side.

With this preferable configuration of the second lens group, it is possible to reduce the flare due to off-axis lower rays by the aspherical surface, while suppressing the chromatic aberration when zooming.

Furthermore, in the above-described small zoom lens of the present invention, it is preferable that the third lens group includes at least one aspherical surface, and includes a meniscus negative lens whose concave surface faces the object side and a lens having a positive refractive power, arranged in that order from the object side.

By disposing a lens having a positive refractive power on the image plane side in the third lens group in this manner, the height of the light rays incident on the fourth lens group is decreased, thus reducing the diameter and weight of the lens. Accordingly, it is possible to reduce the power consumption required for the actuator when focusing.

Further, in the above-described small zoom lens of the present invention, it is preferable that the third lens group satisfies the following Condition (1):

$$4.01 < |f3/f4| < 60, \qquad (1)$$

where f3: focal length of the third lens group, f4: focal length of the fourth lens group.

Condition (1) is an expression relating to the focal length ratio of the third lens group and the fourth lens group. If the lower limit is exceeded, then the refractive power of the fourth lens group becomes too weak, so that the amount of movement of the lens when focusing increases. If the upper limit is exceeded, then the refractive power of the fourth lens group becomes too strong, so that the fluctuation of aberration due to focusing increases.

Furthermore, in the above-described small zoom lens of the present invention, it is preferable that the third lens group satisfies the following Condition (2):

$$14 < |f3/fw| < 210, \qquad (2)$$

where f3: focal length of the third lens group, fw: focal length of the entire system at the wide-angle end.

If the lower limit of Condition (2) is exceeded, then the refractive power of the third lens group becomes too strong, so that the spherical aberration is generated. If the upper limit is exceeded, then the refractive power of the third lens group becomes too weak, so that it is difficult to correct the field curvature.

Further, in the above-described small zoom lens of the present invention, it is preferable that the third lens group satisfies the following Condition (3):

$$3 < |f3/BFw| < 55, \qquad (3)$$

where f3: focal length of the third lens group,

BFw: back focus at the wide-angle end.

If the lower limit of Condition (3) is exceeded, then it is difficult to secure an air space sufficient to insert color separation prisms. If the upper limit is exceeded, the back focus becomes too long, so that it is difficult to achieve compactness.

Further, in the above-described small zoom lens of the present invention, it is preferable that the third lens group satisfies the following Condition (4):

$$0.85 < |f31/f32| < 1.5, \qquad (4)$$

where f31: focal length of the first lens from the object side of the third lens group, f32: focal length of the second lens from the object side of the third lens group.

If the lower limit of Condition (4) is exceeded, then the negative refractive power becomes too strong, so that the negative Petzval Sum increases. Moreover, the diameter of the lens disposed on the image side become too large, which is unfavorable for achieving compactness. On the other hand, if the upper limit is exceeded, then the positive refractive power becomes too strong, so that the spherical aberration and the axial chromatic aberration cannot be corrected sufficiently.

Furthermore, in the above-described small zoom lens of the present invention, it is preferable that the third lens group satisfies the following Conditions (5) and (6):

$$|nd31-nd32|<0.15 \quad (5)$$

$$|vd31-vd32|<3.0, \quad (6)$$

where nd31: refractive index of the lens of the third lens group that is on the object side, nd32: refractive index of the lens of the third lens group that is on the image side, vd31: Abbe number of the lens of the third lens group that is on the object side, vd32: Abbe number of the lens of the third lens group that is on the image side.

In the case of the third lens group, the height of axial rays is largest when at the wide angle. If the upper limit of Condition (5) is exceeded, then the refractive index difference between the lens on the object side and the lens on the image side becomes too large, so that the burden on one of the lenses increases; accordingly, higher order spherical aberration, in particular, tends to be generated. If the upper limit of Condition (6) is exceeded, then the axial chromatic aberration increases.

Furthermore, in the above-described small zoom lens of the present invention, it is preferable that the fourth lens group includes at least one aspherical surface and a pair of cemented lenses, and includes a lens having a positive refractive power, a lens having a negative refractive power and a lens having a positive refractive power, arranged in that order from the object side.

With this preferable configuration of the fourth lens group, it is possible to reduce the height of light rays incident on the negative lens, which is favorable in terms of the Petzval Sum. Moreover, since the final lens is a lens having a positive refractive power, it is possible to reduce the angle of incidence of the off-axis rays on CCDs.

Furthermore, it is preferable that when a refractive power of the surface of the fourth lens group that is closest to the object side is $\phi 41$ and the maximum image height is RIH, the following Condition (7) is satisfied:

$$0.005<\phi 41/RIH<0.035 \quad (7)$$

If the upper limit of Condition (7) is exceeded, then the refractive power becomes too strong, so that the spherical aberration and the coma aberration increase. If the lower limit is exceeded, then it is not possible to obtain a refractive power sufficient to correct the aberrations, so that the spherical aberration and the coma aberration cannot be corrected sufficiently.

Further, it is preferable that a single lens is disposed closest to the object side in the fourth lens group, and when a refractive power of the surface of the single lens that is on the object side is $\phi 41$ and a refractive power of the surface of the single lens that is on the image side is $\phi 42$, the following Condition (8) is satisfied:

$$0.04<(\phi 41-\phi 42)/RIH<0.06 \quad (8)$$

Alternatively, it is preferable that the fourth lens group includes a cemented lens constituted by a lens having a positive refractive power and a lens having a negative refractive power, and a single lens having a positive refractive power, arranged in that order from the object side, and when a refractive power of the surface of the cemented lens that is closest to the object side is $\phi 41$ and a refractive power of the surface of the cemented lens that is closest to the image side is $\phi 43$, the following Condition (9) is satisfied:

$$0.025<(\phi 41-\phi 43)/RIH<0.045 \quad (9)$$

If the upper limits of Condition (8) and Condition (9) are exceeded, then the amount of aberration to be corrected by a single group becomes too large, so that the performance deterioration becomes significant when lens eccentricity occurs. If the lower limits are exceeded, then the aberration correction in a state where there is no eccentricity is not performed sufficiently, although the performance deterioration due to eccentricity is reduced.

Furthermore, according to a video camera and a digital camera of the present invention, a video camera and a digital camera that are compact and exhibit high performance can be provided by using the zoom lens of the present invention.

Hereinafter, embodiments of the zoom lens according to the present invention will be described in detail with reference to the accompanying drawings and tables.

Embodiment 1

FIG. 1 shows the configuration of a small zoom lens according to Embodiment 1 of the present invention.

The small zoom lens according to this embodiment is provided with a first lens group G1, a second lens group G2, an aperture stop (not shown), a third lens group G3 and a fourth lens group G4, arranged in that order from the object side.

The first lens group G1 includes a lens 11 having a negative refractive power, a lens 12 having a positive refractive power and a lens 13 having a positive refractive power, arranged in that order from the object side, has a positive refractive power as a whole, and is fixed with respect to the image plane.

The second lens group G2 has a negative refractive power as a whole, and causes a zooming action when moved along the optical axis. The second lens group G2 includes at least one aspherical surface, and includes a meniscus negative lens 21 whose convex surface faces the object side, a lens 22 having a negative refractive power and a lens 23 having a positive refractive power, arranged in that order from the object side.

The aperture stop is fixed with respect to the image plane.

The third lens group G3 has a positive or negative refractive power as a whole, and is fixed with respect to the direction of the optical axis when zooming and when focusing. The third lens group G3 includes at least one aspherical surface, and includes a meniscus negative lens 31 whose concave surface faces the object side and a lens 32 having a positive refractive power, arranged in that order from the object side.

The fourth lens group G4 has a positive refractive power as a whole, and moves along the optical axis such that the image plane, which is displaced by a movement of the second lens group G2 along the optical axis and by a movement of the object, is maintained at a constant position with respect to a reference plane. The fourth lens group G4 includes at least one aspherical surface, and includes a lens 41 having a positive refractive power, a lens 42 having a negative refractive power and a lens 43 having a positive refractive power, arranged in that order from the object side. The lens 41 and the lens 42 that are on the object side constitute a cemented lens, and the lens 43 on the image side is a single lens.

In FIG. 1, reference numeral 212 denotes a cover glass, a low-pass filter, an IR cut filter and the like in a simplified manner, and 213 denotes color separation prisms in a simplified manner.

In FIG. 1, ri (i is a positive integer) represents the curvature radius of the i-th lens surface, counting from the object side, and di (i is a positive integer) represents the i-th lens thickness or air space between lenses, counting from the object side.

WORKING EXAMPLE 1

In the following, Table 1 shows a specific numerical example of a zoom lens according to Working Example 1, which corresponds to Embodiment 1. In Table 1, r represents the curvature radius of the lens surfaces, d represents the lens thickness or the air space between the lenses, n represents the refractive index of the lenses for the d-line, and ν represents the Abbe number of the lenses for the d-line.

Table 2 shows the aspherical coefficients of the lens surfaces constituting the aspherical surfaces. Each of the aspherical surfaces has a rotationally symmetric aspherical surface shape represented by the following equation:

$$SAG = \frac{H^2/R}{1+\sqrt{1-(1+K)(H/R)^2}} + D \cdot H^4 + E \cdot H^6 + F \cdot H^8 + G \cdot H^{10}$$

where, SAG represents the amount of displacement of the lens surface at the point apart from the optical axis by the height H in the radical direction with respect to the lens apex, R represents the curvature radius, K represents the conical constant, and D, E, F and G represent the aspherical coefficient.

Table 3 shows the values of the variable air space at various zooming positions, when zooming is performed for a given object point located at infinity, measured from the tip of the lens. In Table 3, the standard position is a position where the zooming ratio of the second group is x–1, F/No and ω represent, respectively, the focal length, the F number and the half angle of view of incidence at the wide-angle end, position and the telephoto end of the zoom lens shown in Table 1.

TABLE 1

| group | surface | R | D | n | ν |
|---|---|---|---|---|---|
| 1 | 1 | 42.119 | 0.65 | 1.84666 | 23.9 |
|   | 2 | 17.684 | 3.10 | 1.60311 | 60.7 |
|   | 3 | −74.618 | 0.15 |   |   |
|   | 4 | 14.687 | 1.80 | 1.77250 | 49.6 |
|   | 5 | 40.000 | var. |   |   |
| 2 | 6 | 40.000 | 0.40 | 1.88300 | 40.9 |
|   | 7 | 4.338 | 1.98 |   |   |
|   | 8 | −6.801 | 0.50 | 1.66547 | 55.2 |
|   | 9 | 5.300 | 1.80 | 1.84666 | 23.9 |
|   | 10 | −43.097 | var. |   |   |
| 3 | 11 | −10.000 | 0.55 | 1.69680 | 55.6 |
|   | 12 | −80.000 | 0.27 |   |   |
|   | 13 | 14.355 | 1.65 | 1.60602 | 57.4 |
|   | 14 | −15.716 | var. |   |   |
| 4 | 15 | 35.890 | 1.95 | 1.48749 | 70.4 |
|   | 16 | −9.660 | 0.45 | 1.84666 | 23.9 |

TABLE 1-continued

| group | surface | R | D | n | ν |
|---|---|---|---|---|---|
|   | 17 | −30.874 | 0.12 |   |   |
|   | 18 | 14.530 | 2.20 | 1.51450 | 63.1 |
|   | 19 | −8.387 | var. |   |   |
| 5 | 20 | ∞ | 2.30 | 1.51633 | 64.1 |
|   | 21 | ∞ | 11.00 | 1.58913 | 61.2 |
|   | 22 | ∞ | — |   |   |

TABLE 2

| surface | 8 | 13 | 14 | 18 | 19 |
|---|---|---|---|---|---|
| K | −2.17886E+00 | 0.00000E+00 | 0.00000E+00 | 0.00000E+00 | 0.00000E+00 |
| D | −9.28339E−04 | −2.51088E−04 | 1.17809E−04 | −1.95784E−04 | 4.38665E−04 |
| E | −7.18798E−07 | −2.51467E−05 | −2.54415E−05 | −1.46425E−05 | −1.38232E−05 |
| F | −4.08791E−06 | 0.00000E+00 | 0.00000E+00 | 0.00000E+00 | 0.00000E+00 |
| G | 9.18816E−08 | 0.00000E+00 | 0.00000E+00 | 0.00000E+00 | 0.00000E+00 |

TABLE 3

|   | wide-angle end | standard | telephoto end |
|---|---|---|---|
| f | 2.527 | 11.121 | 24.108 |
| F/NO | 1.870 | 2.161 | 2.840 |
| 2ω | 60.188 | 13.840 | 6.216 |
| d5 | 0.500 | 9.774 | 12.650 |
| d10 | 16.600 | 7.326 | 4.450 |
| d14 | 4.026 | 2.712 | 3.948 |
| d19 | 1.000 | 2.313 | 1.078 |

Figures 2A, 2B, 2C, 2D, 2E:
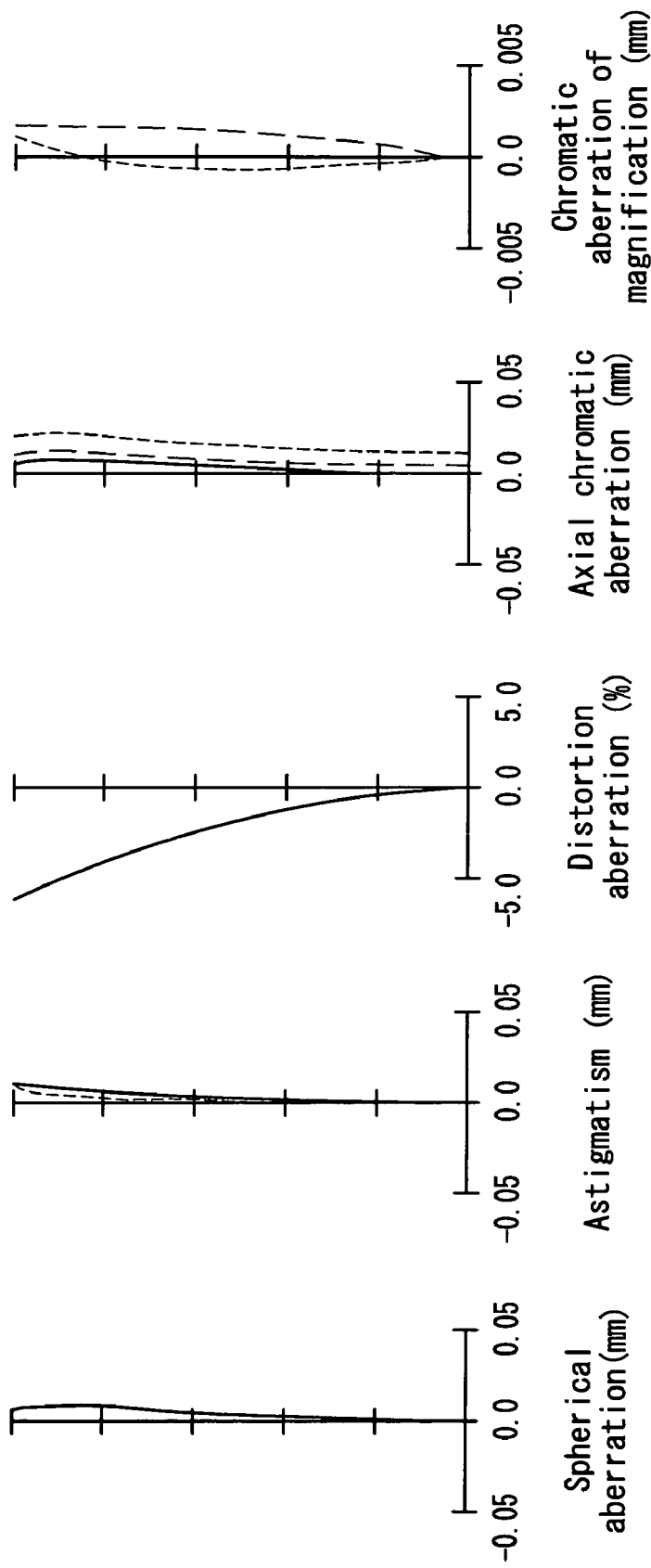
FIGS. 2A to 2E are aberration charts for a small zoom lens according to Working Example 1 of the present invention at the wide-angle end.

FIGS. 2A to 4E show aberration charts of the zoom lens at the wide-angle end, the standard position and the telephoto end. FIGS. 2A, 3A and 4A are the charts for the spherical aberration, with the solid line indicating the values for the d-line. FIGS. 2B, 3B and 4B are the charts for the astigmatism, with the solid line indicating the sagittal field curvature and the dotted line indicating the meridional field curvature. FIGS. 2C, 3C and 4C are the charts showing the distortion aberration. FIGS. 2D, 3D and 4D are the charts for the axial chromatic aberration, with the solid line indicating the values for the d-line, the dotted line indicating the values for the F-line and the dashed line indicating the values for the C-line. FIGS. 2E, 3E and 4E are the charts for the chromatic aberration of magnification, with the dotted line indicating the values for the F-line and the dashed line indicating the values for the C-line.

As is evident from the aberration charts shown in FIGS. 2A to 4E, the zoom lens of Working Example 1 has an aberration correction capability sufficient to achieve high resolution.

The values for the conditional expressions in Working Example 1 are as follows:

|f3/f4|=4.04

|f3/fw|1=16.61

|f3/BFw|=3.86

|f31/f32|=1.30

|nd31−nd32|=0.09

|νd31−νd32|=1.8

RIH=1.375

φ41/RIH=0.01

(φ41−φ43)/RIH=0.03

WORKING EXAMPLE 2

In the following, Table 4 shows a specific numerical example of a zoom lens according to Working Example 2, which corresponds to Embodiment 1. Table 5 shows the aspherical coefficients of the lens surfaces constituting the aspherical surfaces. Table 6 shows the values of the variable air space at various zooming positions, when zooming is performed for a given object point located at infinity, measured from the tip of the lens.

TABLE 4

| group | surface | r | d | n | ν |
|---|---|---|---|---|---|
| 1 | 1 | 45.747 | 0.65 | 1.84666 | 23.9 |
|   | 2 | 18.436 | 3.10 | 1.60311 | 60.7 |
|   | 3 | −60.132 | 0.15 |   |   |
|   | 4 | 14.023 | 1.80 | 1.77250 | 49.6 |
|   | 5 | 32.850 | var. |   |   |
| 2 | 6 | 32.850 | 0.40 | 1.88300 | 40.9 |
|   | 7 | 4.365 | 1.98 |   |   |
|   | 8 | −6.556 | 0.50 | 1.66547 | 55.2 |
|   | 9 | 5.386 | 1.80 | 1.84666 | 23.9 |
|   | 10 | −44.614 | var. |   |   |
| 3 | 11 | −10.000 | 0.55 | 1.69680 | 55.6 |
|   | 12 | −80.000 | 0.20 |   |   |
|   | 13 | 13.147 | 1.45 | 1.60602 | 57.4 |
|   | 14 | −18.722 | var. |   |   |
| 4 | 15 | 27.257 | 2.00 | 1.48749 | 70.4 |
|   | 16 | −9.718 | 0.45 | 1.84666 | 23.9 |
|   | 17 | −30.743 | 0.20 |   |   |
|   | 18 | 14.837 | 1.95 | 1.51450 | 63.1 |
|   | 19 | −8.513 | var. |   |   |
| 5 | 20 | ∞ | 2.30 | 1.51633 | 64.1 |
|   | 21 | ∞ | 11.00 | 1.58913 | 61.2 |
|   | 22 | ∞ | − |   |   |

TABLE 5

| surface | 8 | 13 | 18 | 19 |
|---|---|---|---|---|
| K | −3.86106E+00 | 0.00000E+00 | 0.00000E+00 | 0.00000E+00 |
| D | −1.88746E−03 | −4.02222E−04 | −1.90832E−04 | 4.51829E−04 |
| E | 7.81554E−05 | 2.64132E−06 | −3.03252E−06 | −4.27485E−06 |
| F | −1.40338E−05 | 0.00000E+00 | 0.00000E+00 | 0.00000E+00 |
| G | 6.62510E−07 | 0.00000E+00 | 0.00000E+00 | 0.00000E+00 |

TABLE 6

|   | wide-angle end | standard | telephoto end |
|---|---|---|---|
| F | 2.549 | 11.450 | 24.699 |
| F/NO | 1.876 | 2.191 | 2.840 |
| 2ω | 59.738 | 13.514 | 6.256 |
| d5 | 0.500 | 9.838 | 12.650 |
| d10 | 16.600 | 7.262 | 1.315 |
| d14 | 4.026 | 2.622 | 4.365 |
| d19 | 1.000 | 2.404 | 1.091 |

FIGS. 5A to 7E show aberration charts of the zoom lens according to Working Example 2 at the wide-angle end, the standard position and the telephoto end.

As is evident from the aberration charts shown in FIGS. 5A to 7E, the zoom lens of Working Example 2 has an aberration correction capability sufficient to achieve high resolution.

The values for the conditional expressions in Working Example 2 are as follows:

|f3/f4|=4.74

|f3/fw|=18.86

|f3/BFw|=4.40

|f31/f32|=1.27

|nd31−nd32|=0.09

|vd31−vd32|=1.8

RIH=1.375

φ41/RIH=0.013

(φ41−φ43)/RIH=0.033

WORKING EXAMPLE 3

In the following, Table 7 shows a specific numerical example of a zoom lens according to Working Example 3, which corresponds to Embodiment 1. Table 8 shows the aspherical coefficients of the lens surfaces constituting the aspherical surfaces. Table 9 shows the values of the variable air space at various zooming positions, when zooming is performed for a given object point located at infinity, measured from the tip of the lens.

TABLE 7

| group | surface | r | d | n | ν |
|---|---|---|---|---|---|
| 1 | 1 | 42.816 | 0.65 | 1.84666 | 23.9 |
|   | 2 | 17.686 | 3.10 | 1.60311 | 60.7 |
|   | 3 | −75.026 | 0.15 |   |   |
|   | 4 | 14.570 | 1.80 | 1.77250 | 49.6 |
|   | 5 | 40.000 | var. |   |   |
| 2 | 6 | 40.000 | 0.40 | 1.88300 | 40.9 |
|   | 7 | 4.364 | 1.98 |   |   |
|   | 8 | −6.818 | 0.50 | 1.66547 | 55.2 |
|   | 9 | 5.407 | 1.80 | 1.84666 | 23.9 |
|   | 10 | −43.944 | var. |   |   |
| 3 | 11 | −10.000 | 0.55 | 1.69680 | 55.6 |
|   | 12 | −80.000 | 0.20 |   |   |
|   | 13 | 14.650 | 1.60 | 1.60602 | 57.4 |
|   | 14 | −16.581 | var. |   |   |
| 4 | 15 | 22.551 | 1.80 | 1.48749 | 70.4 |
|   | 16 | −9.718 | 0.45 | 1.84666 | 23.9 |
|   | 17 | −30.178 | 0.20 |   |   |
|   | 18 | 16.615 | 2.10 | 1.51450 | 63.1 |
|   | 19 | −8.614 | var. |   |   |
| 5 | 20 | ∞ | 2.30 | 1.51633 | 64.1 |
|   | 21 | ∞ | 11.00 | 1.58913 | 61.2 |
|   | 22 | ∞ | − |   |   |

TABLE 8

| surface | 8 | 13 | 14 | 18 | 19 |
|---|---|---|---|---|---|
| K | −3.72923E+00 | 0.00000E+00 | 0.00000E+00 | 0.00000E+00 | 0.00000E+00 |
| D | −1.58644E−03 | −6.95221E−04 | −3.06071E−04 | −2.55430E−04 | 3.88552E−04 |
| E | 7.57996E−05 | −8.74395E−06 | −1.30855E−05 | −4.79720E−06 | −6.72353E−06 |
| F | −1.53871E−05 | 0.00000E+00 | 0.00000E+00 | 0.00000E+00 | 0.00000E+00 |
| G | 8.08638E−07 | 0.00000E+00 | 0.00000E+00 | 0.00000E+00 | 0.00000E+00 |

TABLE 9

|  | wide-angle end | standard | telephoto end |
|---|---|---|---|
| f | 2.539 | 11.248 | 24.817 |
| F/NO | 1.878 | 2.191 | 2.850 |
| 2ω | 59.964 | 13.738 | 6.214 |
| d5 | 0.500 | 9.747 | 12.705 |
| d10 | 16.600 | 7.353 | 4.395 |
| d14 | 4.026 | 2.656 | 4.026 |
| d19 | 1.000 | 2.370 | 1.000 |

FIGS. 8A to 10E show aberration charts of the zoom lens according to Working Example 3 at the wide-angle end, the standard position and the telephoto end.

As is evident from the aberration charts shown in FIGS. 8A to 10E, the zoom lens of Working Example 3 has an aberration correction capability sufficient to achieve high resolution.

The values for the conditional expressions in Working Example 3 are as follows:

|f3/f4|=4.77

|f3/fw|=19.21

|f3/BFw|=4.47

|f31/f32|=1.26

|nd31−nd32|=0.09

|vd31−vd32|=1.8

RIH=1.375

φ41/RIH=0.016

(φ41−φ43)/RIH=0.036

Embodiment 2

Figure 11:
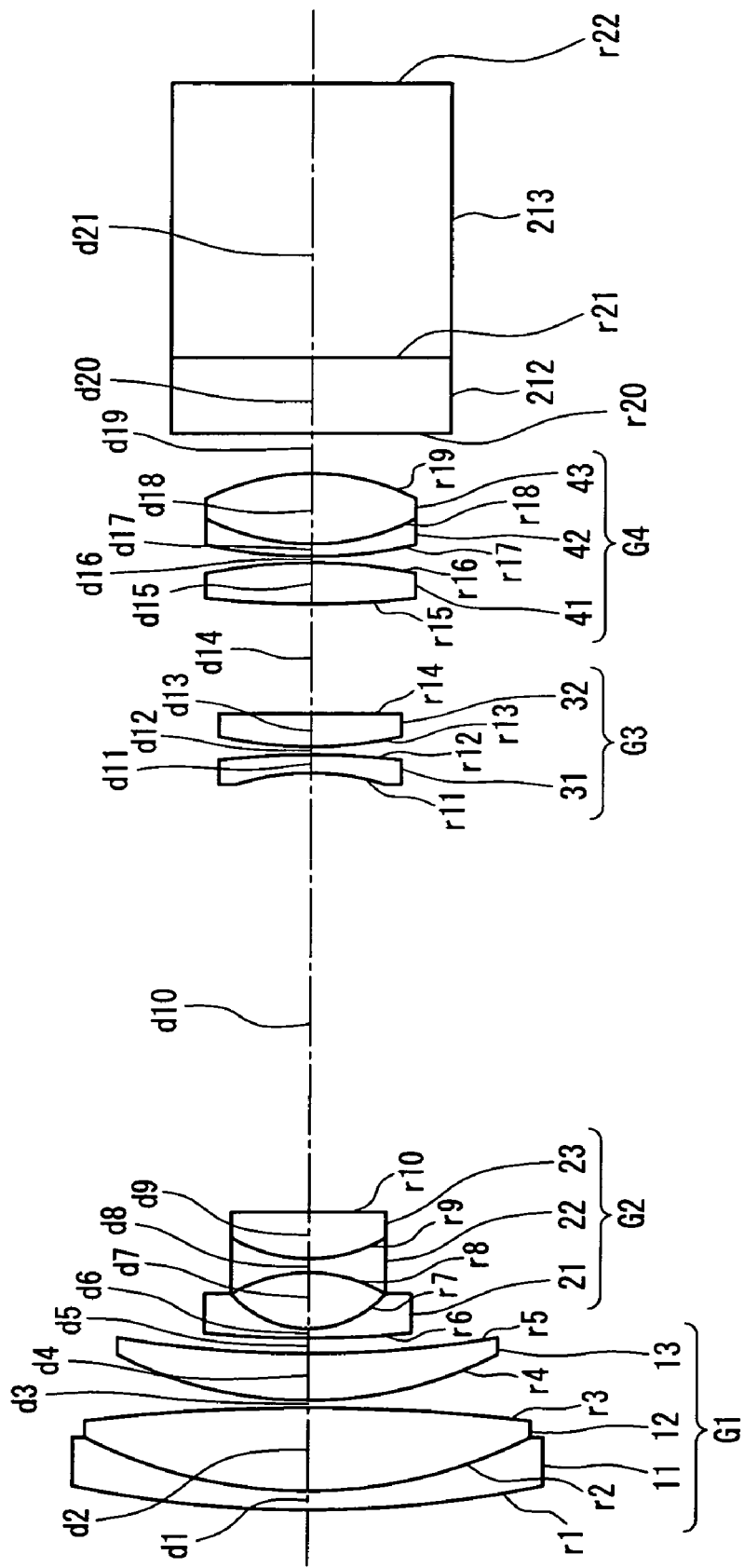
FIG. 11 is a diagram showing the configuration of a small zoom lens according to Embodiment 2 of the present invention.
Figure 12:
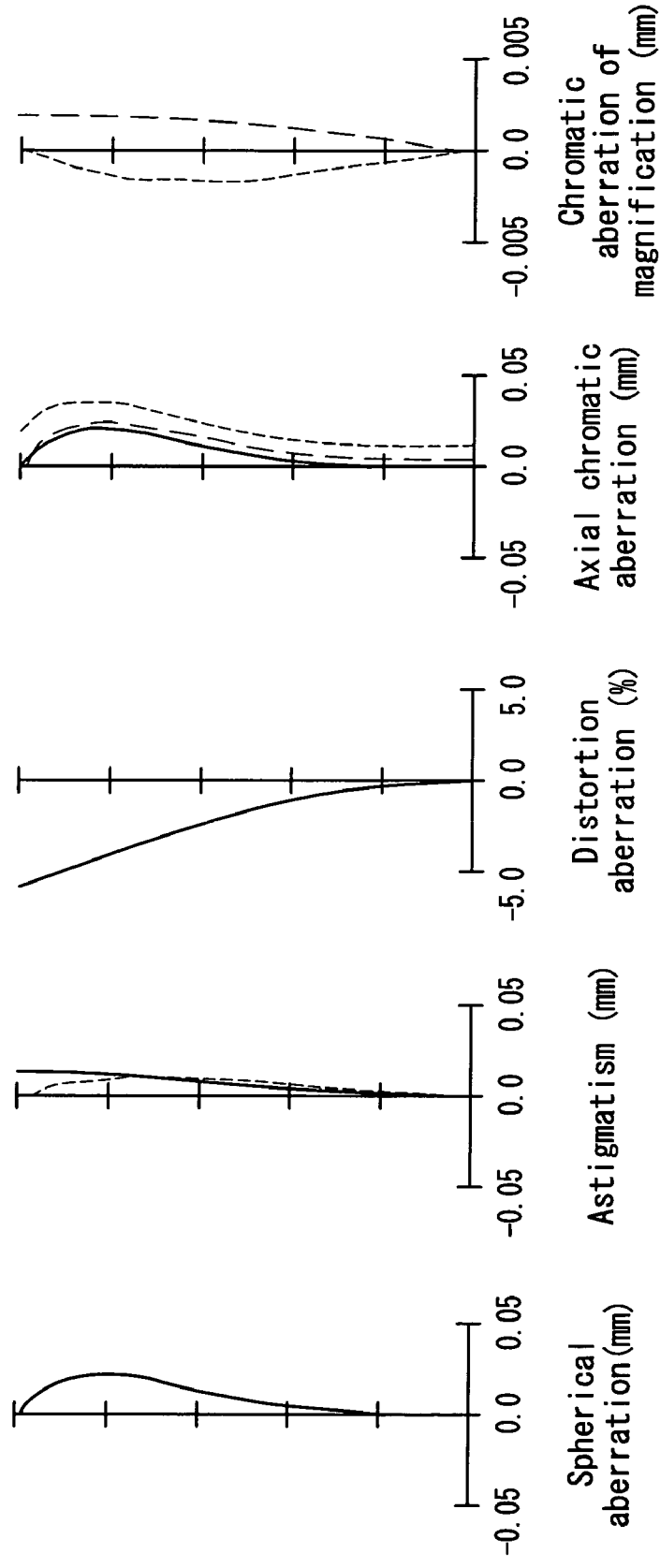
FIGS. 12A to 12E are aberration charts for a small zoom lens according to Working Example 4 of the present invention at the wide-angle end.
Figure 13:
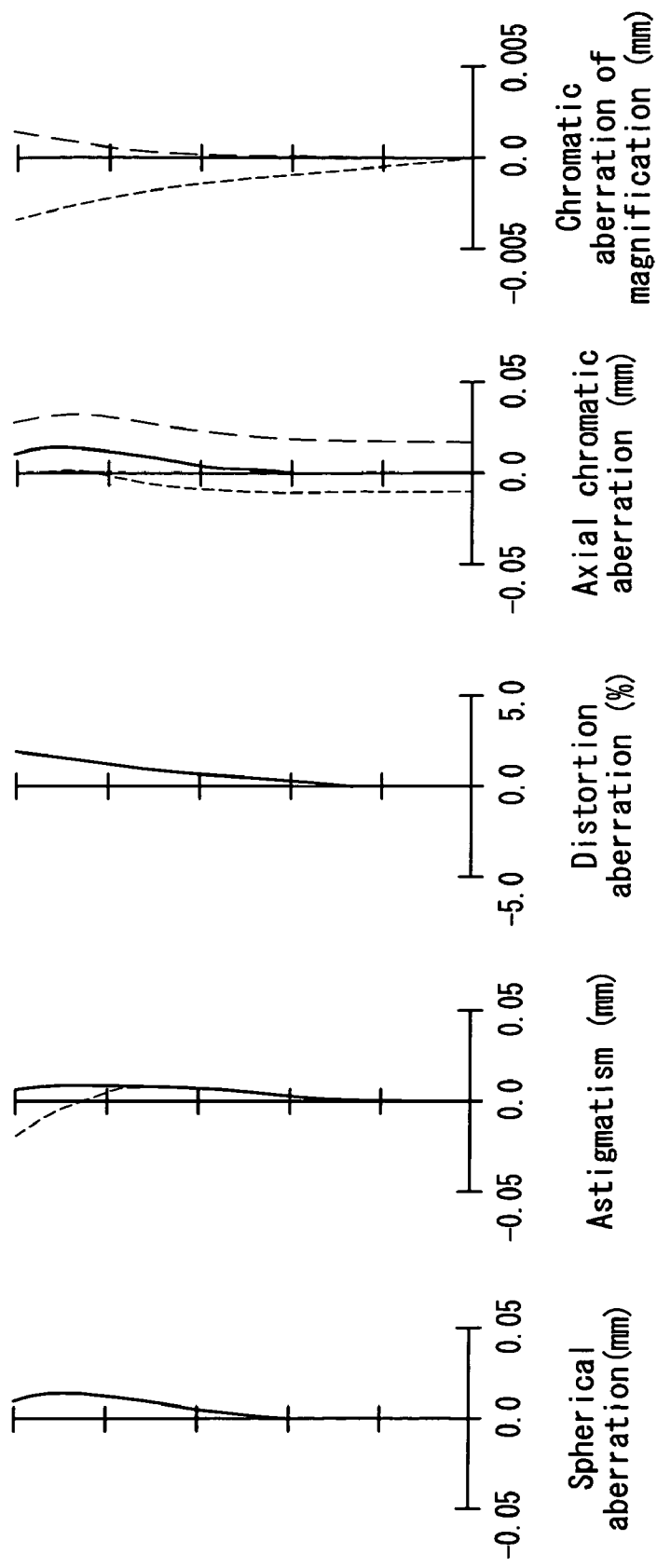
FIGS. 13A to 13E are aberration charts for the small zoom lens according to Working Example 4 of the present invention at the standard position.
Figure 14:
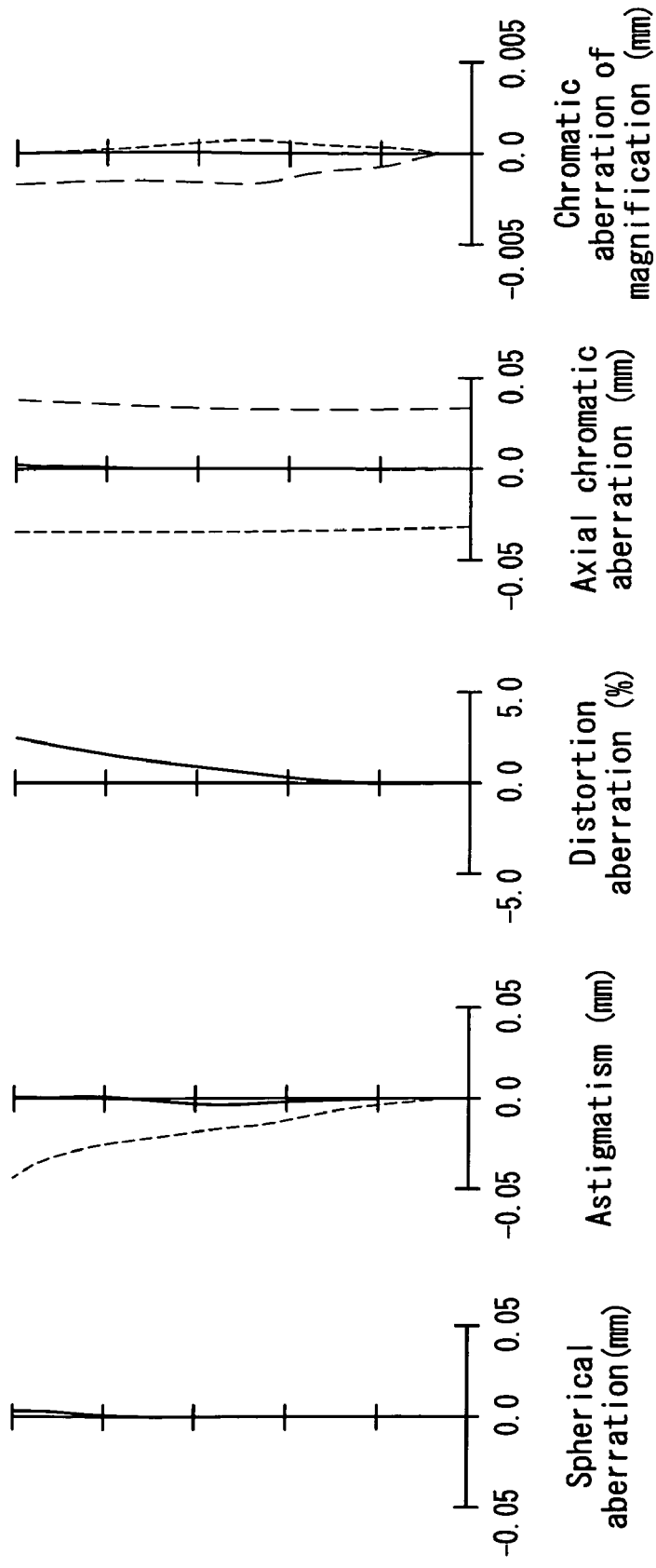
FIGS. 14A to 14E are aberration charts for the small zoom lens according to Working Example 4 of the present invention at the telephoto end.
Figure 15:
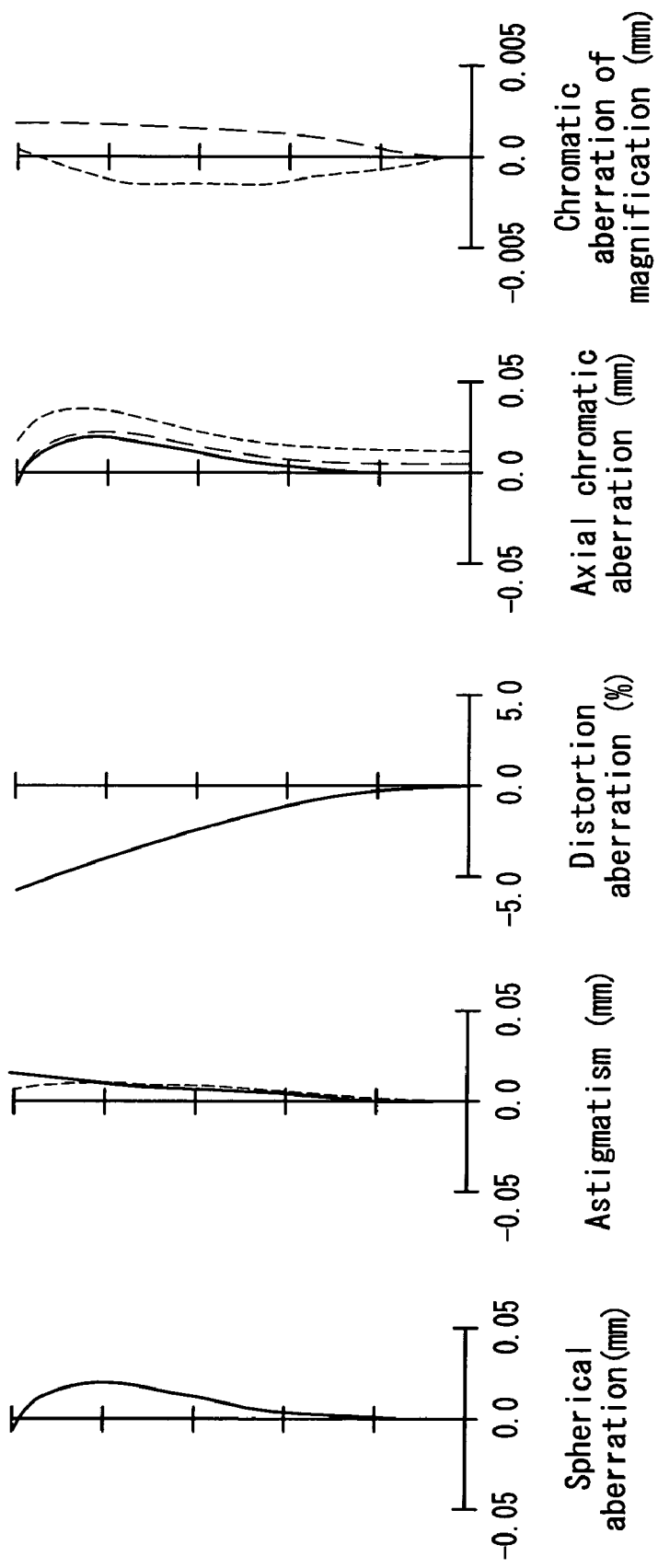
FIGS. 15A to 15E are aberration charts for a small zoom lens according to Working Example 5 of the present invention at the wide-angle end.
Figure 16:
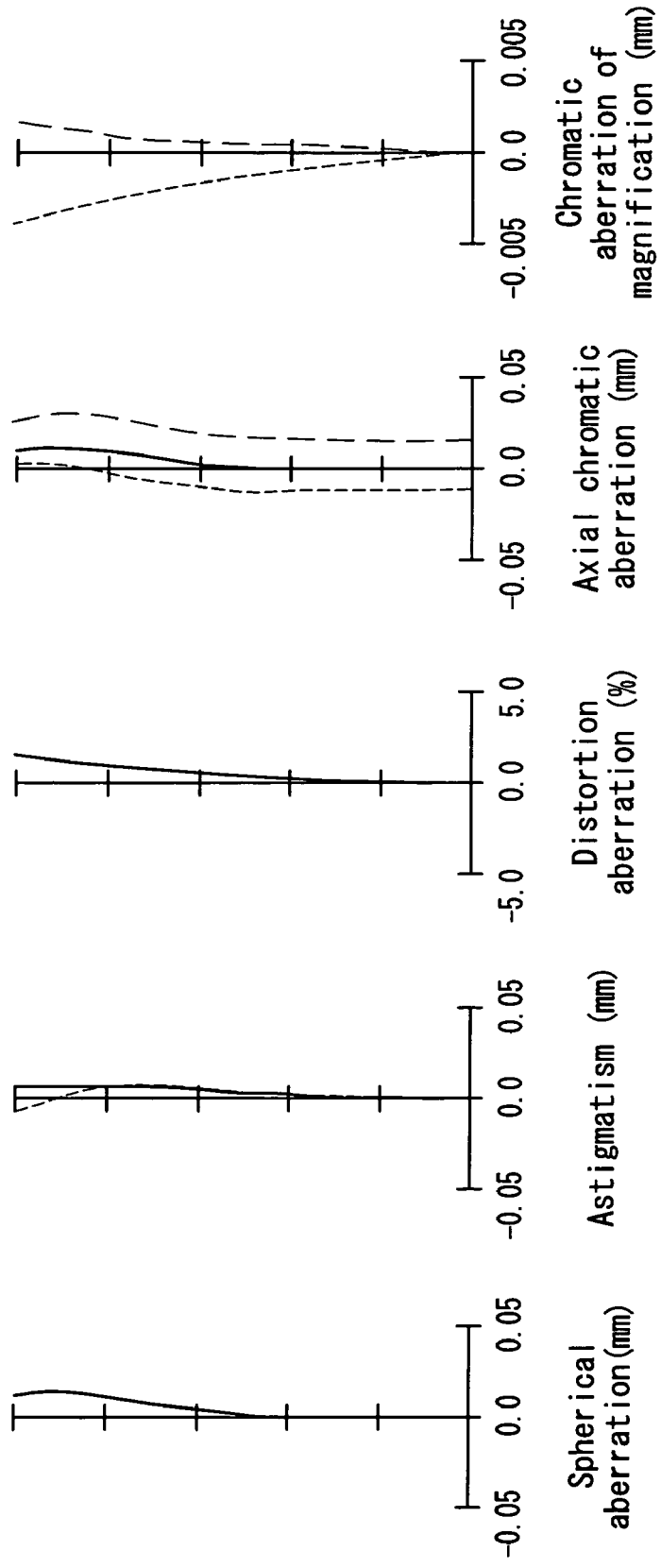
FIGS. 16A to 16E are aberration charts for the small zoom lens according to Working Example 5 of the present invention at the standard position.
Figure 17:
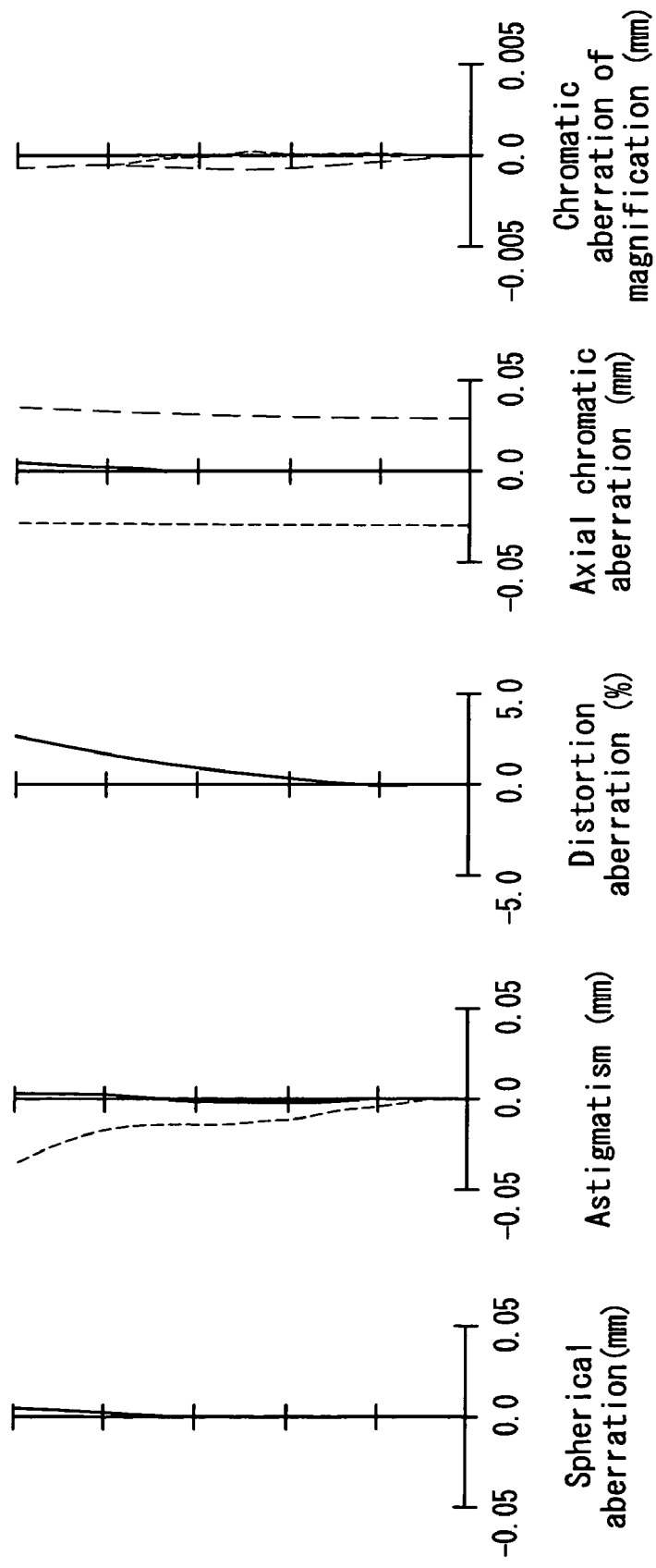
FIGS. 17A to 17E are aberration charts for the small zoom lens according to Working Example 5 of the present invention at the telephoto end.
Figure 18:
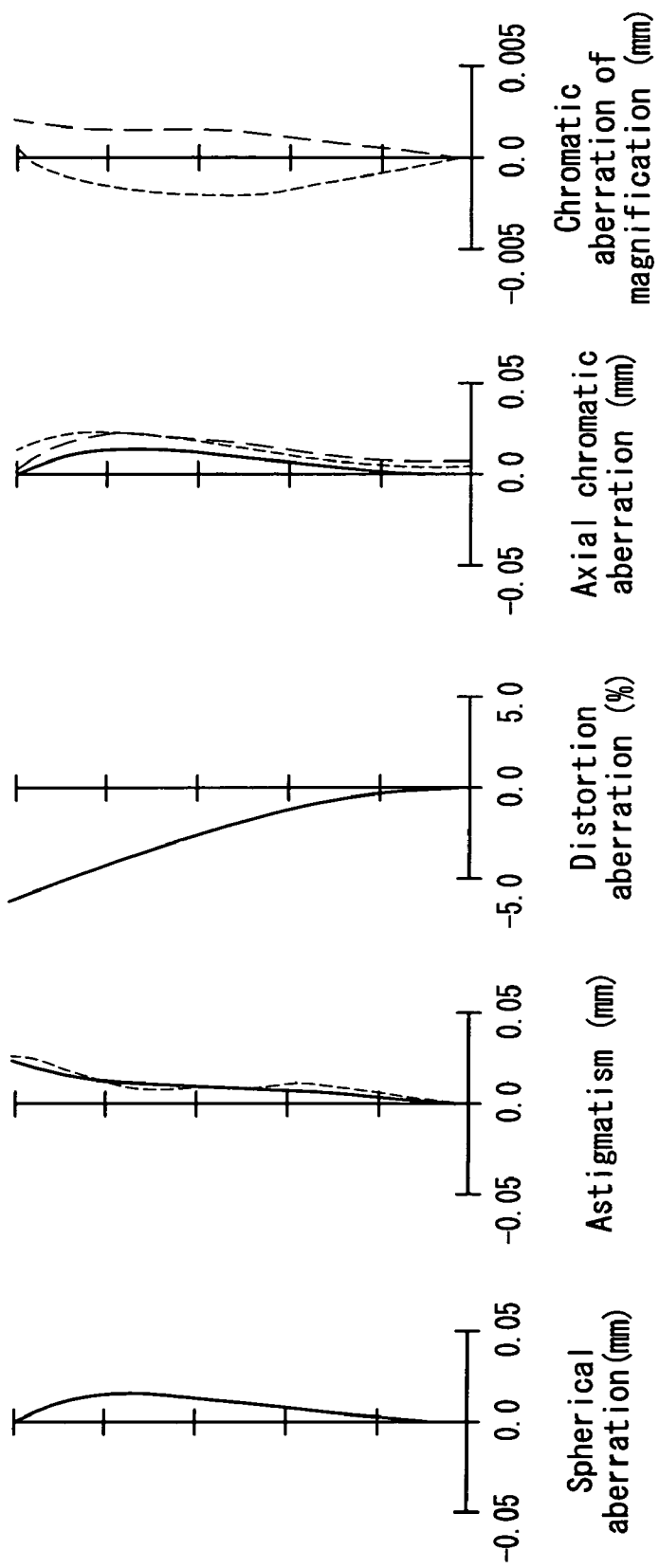
FIGS. 18A to 18E are aberration charts for a small zoom lens according to Working Example 6 of the present invention at the wide-angle end.
Figure 19:
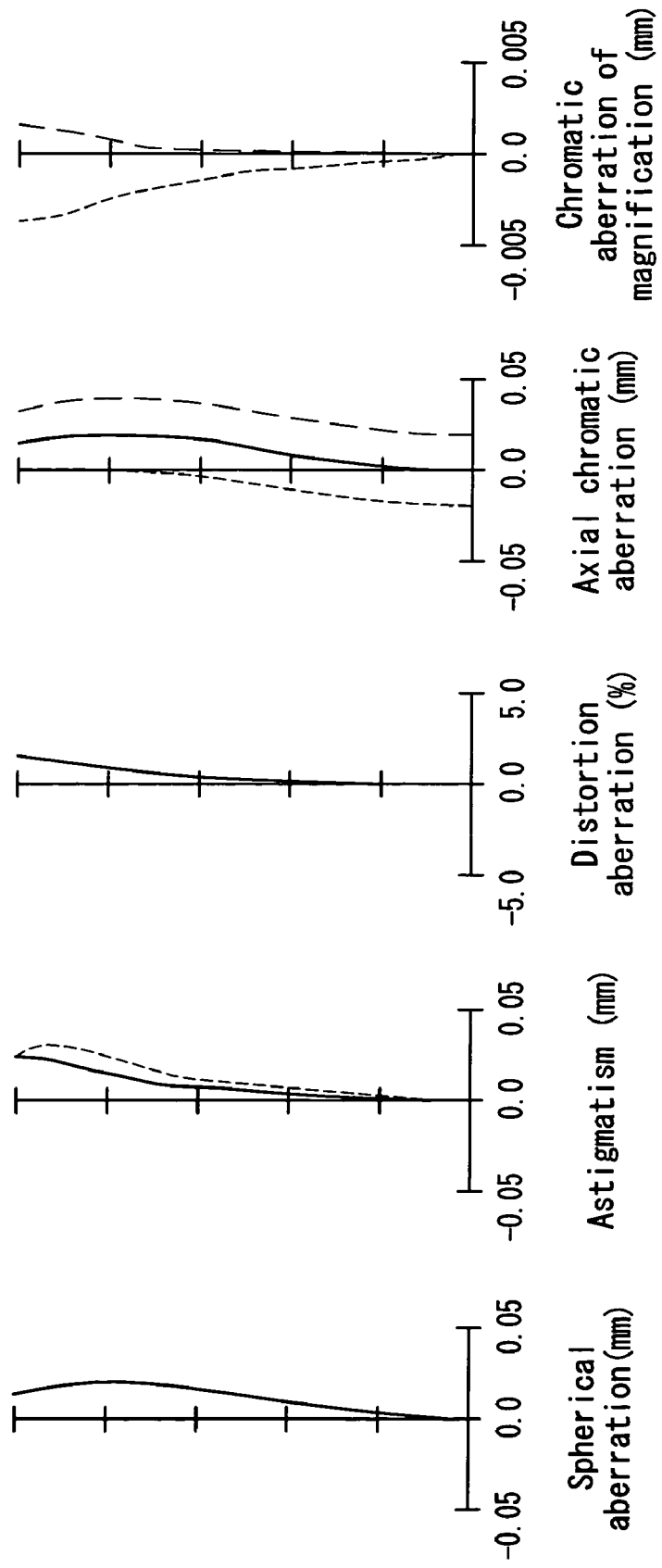
FIGS. 19A to 19E are aberration charts for the small zoom lens according to Working Example 6 of the present invention at the standard position.
Figure 20:
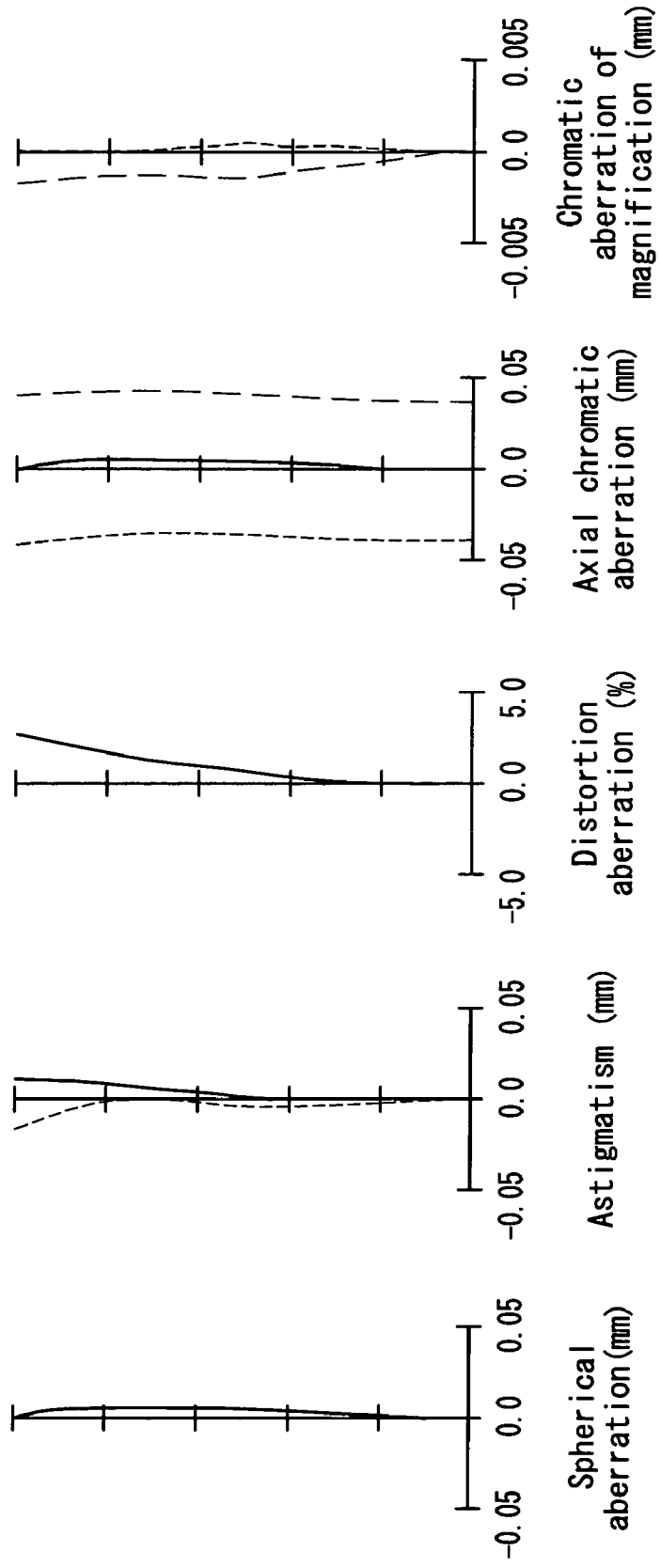
FIGS. 20A to 20E are aberration charts for the small zoom lens according to Working Example 6 of the present invention at the telephoto end.

FIG. 11 shows the configuration of a small zoom lens according to Embodiment 2 of the present invention.

The same structural components as those in FIG. 1 of Embodiment 1 are given the same reference numerals, and the description thereof has been omitted.

Embodiment 2 is different from Embodiment 1 only in the configuration of the fourth lens group G4. The fourth lens group G4 of Embodiment 2 has a positive refractive power as a whole, and moves along the optical axis such that the image plane, which is displaced by a movement of the second lens group G2 along the optical axis and by a movement of the object, is maintained at a constant position with respect to a reference plane. The fourth lens group G4 includes at least one aspherical surface, and includes a lens 41 having a positive refractive power, a lens 42 having a negative refractive power and a lens 43 having a positive refractive power, arranged in that order from the object side. In contrast to Embodiment 1, the lens 41 on the object side is a single lens, and the lens 42 and the lens 43 that are on the image side constitute a cemented lens.

EXAMPLE 4

In the following, Table 10 shows a specific numerical example of a zoom lens according to Working Example 4, which corresponds to Embodiment 2. Table 11 shows the aspherical coefficients of the lens surfaces constituting the aspherical surfaces. Table 12 shows the values of the variable air space at various zooming positions, when zooming is performed for a given object point located at infinity, measured from the tip of the lens.

TABLE 10

| group | surface | r | d | n | ν |
|---|---|---|---|---|---|
| 1 | 1 | 44.764 | 0.65 | 1.84666 | 23.9 |
|  | 2 | 18.093 | 3.10 | 1.60311 | 60.7 |
|  | 3 | −68.829 | 0.15 |  |  |
|  | 4 | 14.829 | 1.80 | 1.77250 | 49.6 |
|  | 5 | 41.509 | var. |  |  |
| 2 | 6 | 41.509 | 0.40 | 1.88300 | 40.9 |
|  | 7 | 4.537 | 1.98 |  |  |
|  | 8 | −6.603 | 0.50 | 1.66547 | 55.2 |
|  | 9 | 5.554 | 1.80 | 1.84666 | 23.9 |
|  | 10 | −46.566 | var. |  |  |
| 3 | 11 | −10.000 | 0.55 | 1.69680 | 55.6 |
|  | 12 | −80.000 | 0.20 |  |  |
|  | 13 | 11.653 | 1.35 | 1.60602 | 57.4 |
|  | 14 | −58.732 | var. |  |  |
| 4 | 15 | 12.681 | 1.70 | 1.51450 | 63.1 |
|  | 16 | −14.391 | 0.35 |  |  |
|  | 17 | ∞ | 0.45 | 1.84666 | 23.9 |
|  | 18 | 14.867 | 2.25 | 1.48749 | 70.4 |
|  | 19 | −7.554 | var. |  |  |
| 5 | 20 | ∞ | 2.30 | 1.51633 | 64.1 |
|  | 21 | ∞ | 11.00 | 1.58913 | 61.2 |
|  | 22 | ∞ | − |  |  |

TABLE 11

| surface | 8 | 13 | 15 | 16 |
|---|---|---|---|---|
| K | −3.04317E+00 | 0.00000E+00 | −5.07847E−01 | −3.10062E+00 |
| D | −1.38546E−03 | −4.33897E−04 | −2.80966E−06 | 7.34395E−04 |
| E | 2.20637E−05 | 1.60648E−06 | 3.08781E−06 | 4.08252E−06 |
| F | −3.87080E−06 | 0.00000E+00 | 0.00000E+00 | 0.00000E+00 |
| G | 1.05179E−07 | 0.00000E+00 | 0.00000E+00 | 0.00000E+00 |

TABLE 12

|  | wide-angle end | standard | telephoto end |
|---|---|---|---|
| f | 2.521 | 11.733 | 24.676 |
| F/NO | 1.872 | 2.267 | 3.022 |
| 2ω | 60.180 | 13.120 | 6.210 |
| d5 | 0.500 | 9.767 | 12.720 |
| d10 | 16.600 | 7.333 | 4.380 |

TABLE 12-continued

|  | wide-angle end | standard | telephoto end |
|---|---|---|---|
| d14 | 4.026 | 2.401 | 4.016 |
| d19 | 1.000 | 2.625 | 1.009 |

FIGS. 12A to 14E show aberration charts of the zoom lens according to Working Example 4 at the wide-angle end, the standard position and the telephoto end.

As is evident from the aberration charts shown in FIGS. 12A to 14E, the zoom lens of Working Example 4 has an aberration correction capability sufficient to achieve high resolution.

The values for the conditional expressions in Working Example 4 are as follows:

|f3/f4|=28.16

|f3/fw|=105.08

|f3/BFw|=24.32

|f31/f32|=1.02

|nd31−nd32|=0.09

|vd31−vd32|=1.8

RIH=1.375

φ41/RIH=0.03

(φ41−φ43)/RIH=0.056

EXAMPLE 5

In the following, Table 13 shows a specific numerical example of a zoom lens according to Working Example 5, which corresponds to Embodiment 2. Table 14 shows the aspherical coefficients of the lens surfaces constituting the aspherical surfaces. Table 15 shows the values of the variable air space at various zooming positions, when zooming is performed for a given object point located at infinity, measured from the tip of the lens.

TABLE 13

| group | surface | r | d | n | ν |
|---|---|---|---|---|---|
| 1 | 1 | 34.170 | 0.65 | 1.84666 | 23.9 |
|  | 2 | 17.739 | 3.20 | 1.49700 | 81.6 |
|  | 3 | −61.283 | 0.15 |  |  |
|  | 4 | 14.762 | 1.80 | 1.77250 | 49.6 |
|  | 5 | 43.687 | var. |  |  |
| 2 | 6 | 43.687 | 0.40 | 1.88300 | 40.9 |
|  | 7 | 4.471 | 1.98 |  |  |
|  | 8 | −6.612 | 0.50 | 1.66547 | 55.2 |
|  | 9 | 5.560 | 1.80 | 1.84666 | 23.9 |
|  | 10 | −41.180 | var. |  |  |
| 3 | 11 | −10.000 | 0.55 | 1.69680 | 55.6 |
|  | 12 | −80.000 | 0.20 |  |  |
|  | 13 | 12.663 | 1.35 | 1.60602 | 57.4 |
|  | 14 | −40.439 | var. |  |  |
| 4 | 15 | 12.300 | 1.70 | 1.51450 | 63.1 |
|  | 16 | −15.402 | 0.35 |  |  |
|  | 17 | ∞ | 0.45 | 1.84666 | 23.9 |
|  | 18 | 14.818 | 2.25 | 1.48749 | 70.4 |
|  | 19 | −7.524 | var. |  |  |
| 5 | 20 | ∞ | 2.30 | 1.51633 | 64.1 |
|  | 21 | ∞ | 11.00 | 1.58913 | 61.2 |
|  | 22 | ∞ | — |  |  |

TABLE 14

| surface | 8 | 13 | 15 | 16 |
|---|---|---|---|---|
| K | −3.57190E+00 | 0.00000E+00 | −6.27182E−01 | −3.29444E+00 |
| D | −1.58537E−03 | −3.73437E−04 | −8.48880E−06 | 7.35383E−04 |
| E | 2.82612E−05 | −2.63365E−07 | 2.74820E−06 | 3.29235E−06 |
| F | −3.72365E−06 | 0.00000E+00 | 0.00000E+00 | 0.00000E+00 |
| G | 7.39995E−08 | 0.00000E+00 | 0.00000E+00 | 0.00000E+00 |

TABLE 15

|  | wide-angle end | standard | telephoto end |
|---|---|---|---|
| f | 2.513 | 11.625 | 24.817 |
| F/NO | 1.867 | 2.255 | 2.819 |
| 2ω | 60.272 | 13.240 | 6.218 |
| d5 | 0.500 | 9.775 | 12.736 |
| d10 | 16.600 | 7.325 | 4.365 |
| d14 | 4.026 | 2.695 | 4.026 |
| d19 | 1.000 | 2.331 | 1.000 |

FIGS. 15A to 17E show aberration charts of the zoom lens according to Working Example 5 at the wide-angle end, the standard position and the telephoto end.

As is evident from the aberration charts shown in FIGS. 15A to 17E, the zoom lens of Working Example 5 has an aberration correction capability sufficient to achieve high resolution.

The values for the conditional expressions in Working Example 5 are as follows:

|f3/f4|=23.99

|f3/fw|=90.53

|f3/BFw|=20.86

|f31/f32|=1.02

|nd31−nd32|=0.09

|vd31−vd32|=1.8

RIH=1.375

φ41/RIH=0.03

(φ41−φ43)/RIH=0.055

EXAMPLE 6

In the following, Table 16 shows a specific numerical example of a zoom lens according to Working Example 6, which corresponds to Embodiment 2. Table 17 shows the aspherical coefficients of the lens surfaces constituting the aspherical surfaces. Table 18 shows the values of the variable air space at various zooming positions, when zooming is performed for a given object point located at infinity, measured from the tip of the lens.

TABLE 16

| group | surface | r | d | n | ν |
|---|---|---|---|---|---|
| 1 | 1 | 47.499 | 0.65 | 1.84666 | 23.9 |
|  | 2 | 18.666 | 3.10 | 1.49700 | 81.6 |
|  | 3 | −59.606 | 0.15 |  |  |
|  | 4 | 14.385 | 1.80 | 1.77250 | 49.6 |
|  | 5 | 36.141 | var. |  |  |

TABLE 16-continued

| group | surface | r | d | n | v |
|---|---|---|---|---|---|
| 2 | 6 | 36.141 | 0.40 | 1.88300 | 40.9 |
|  | 7 | 4.643 | 1.98 |  |  |
|  | 8 | −7.099 | 0.50 | 1.66547 | 55.2 |
|  | 9 | −5.054 | 1.80 | 1.84666 | 23.9 |
|  | 10 | −169.683 | var. |  |  |
| 3 | 11 | 10.000 | 0.55 | 1.69680 | 55.6 |
|  | 12 | −47.979 | 0.20 |  |  |
|  | 13 | 15.594 | 1.35 | 1.60602 | 57.4 |
|  | 14 | −50.058 | var. |  |  |
| 4 | 15 | 14.885 | 1.70 | 1.51450 | 63.1 |
|  | 16 | −18.381 | 0.35 |  |  |
|  | 17 | 21.291 | 0.45 | 1.84666 | 23.9 |
|  | 18 | 9.228 | 2.25 | 1.48749 | 70.4 |
|  | 19 | −8.650 | var. |  |  |
| 5 | 20 | ∞ | 2.30 | 1.51633 | 64.1 |
|  | 21 | ∞ | 11.00 | 1.58913 | 61.2 |
|  | 22 | ∞ | – |  |  |

TABLE 17

| surface | 8 | 13 | 14 | 15 | 16 |
|---|---|---|---|---|---|
| K | −2.62793E+00 | 0.00000E+00 | 0.00000E+00 | 4.71412E−01 | 8.46971E−01 |
| D | −1.18751E−03 | −7.26655E−04 | −3.29720E−04 | 9.66901E−06 | 6.52678E−04 |
| E | 2.51942E−05 | −4.66447E−05 | −4.37520E−05 | 4.09662E−06 | 5.12648E−06 |
| F | −5.50514E−06 | 0.00000E+00 | 0.00000E+00 | 0.00000E+00 | 0.00000E+00 |
| G | 1.65637E−07 | 0.00000E+00 | 0.00000E+00 | 0.00000E+00 | 0.00000E+00 |

TABLE 18

|  | wide-angle end | standard | telephoto end |
|---|---|---|---|
| f | 2.467 | 11.448 | 24.260 |
| F/NO | 1.866 | 2.185 | 2.711 |
| 2ω | 61.348 | 13.446 | 6.308 |
| d5 | 0.500 | 9.714 | 12.736 |
| d10 | 16.600 | 7.386 | 4.395 |
| d14 | 4.456 | 2.827 | 4.477 |
| d19 | 1.000 | 2.599 | 0.949 |

FIGS. 18A to 20E show aberration charts of the zoom lens according to Working Example 6 at the wide-angle end, the standard position and the telephoto end.

As is evident from the aberration charts shown in FIGS. 18A to 20E, the zoom lens of Working Example 6 has an aberration correction capability sufficient to achieve high resolution.

The values for the conditional expressions in Working Example 6 are as follows:

$|f3/f4|=54.7$ $|f3/fw|=200.31$ $|f3/BFw|=50.368$ $|f31/f32|=0.92$ $|nd31-nd32|=0.09$ $|vd31-vd32|=1.8$ $RIH=1.375$ $\phi 41/RIH=0.025$ $(\phi 41-\phi 43)/RIH=0.046$ Embodiment 3

Figure 21:
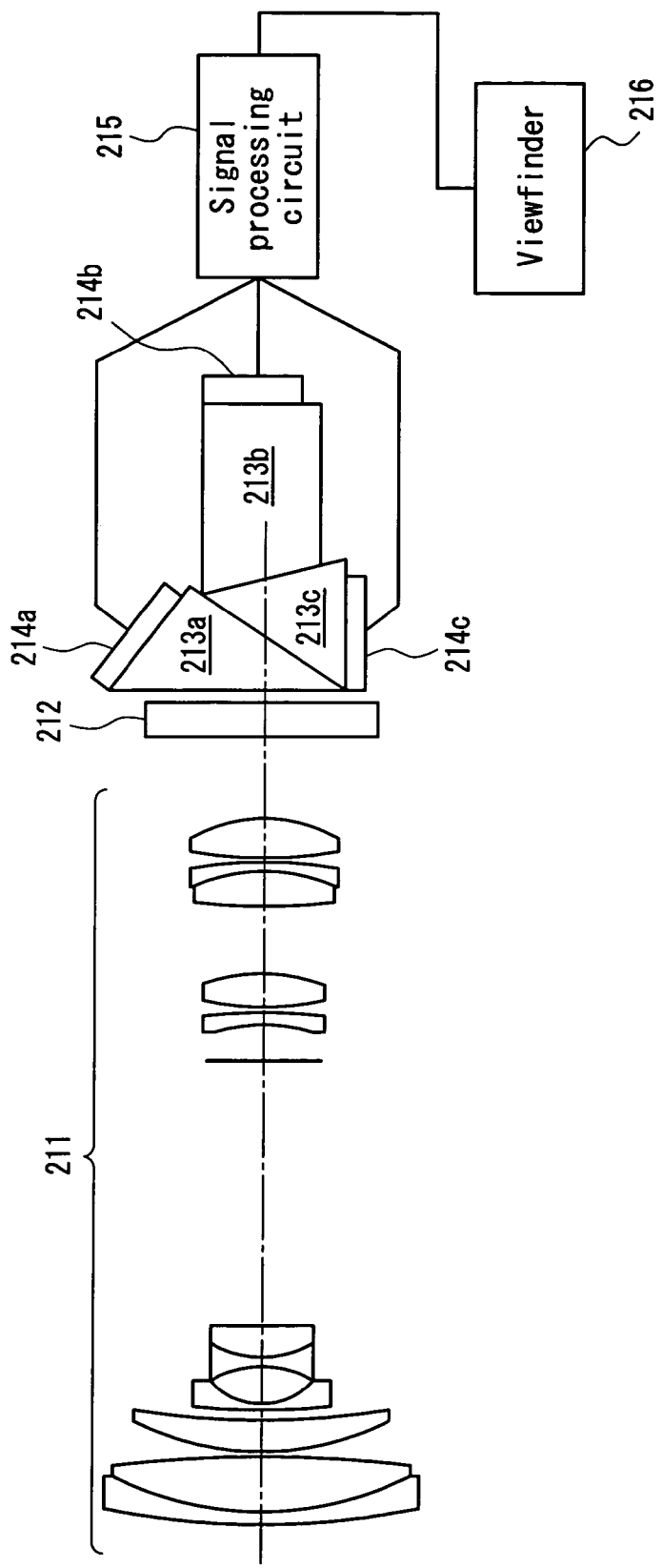
FIG. 21 is a diagram schematically showing the configuration of a video camera according to Embodiment 3 of the present invention.

FIG. 21 is a diagram showing the configuration of a video camera constituted using the zoom lens of the present invention. Reference numeral 211 denotes the zoom lens according to Embodiment 1, 212 denotes a low-pass filter, an IR absorbing glass and the like, 213a to 213c denote color separation prisms, 214a to 214c denote CCDs, 215 denotes a signal processing circuit, and 216 denotes a viewfinder.

After unnecessary light components are removed with the low-pass filter and IR absorbing glass 212, light that has passed through the zoom lens 211 is split into red, green and blue light with the color separation prisms 213a to 213c, then imaged on the light-receiving surfaces of the CCDs 214a to 214c. Output signals from the CCDs 214a to 214c that correspond respectively to the red, green and blue light are operated with the signal processing circuit 215, and a color image is displayed on the viewfinder 216. Furthermore, output signals from the signal processing circuit 215 are input to a video recording circuit (not shown), and a video image is recorded in a particular recording medium.

Since the video camera according to this embodiment uses the zoom lens of the present invention, it is possible to provide a compact, high-image quality video camera.

It should be noted that the zoom lens of Embodiment 2 may be used as the zoom lens 211.

It is also possible to form a digital camera for recording still images, using a configuration similar to that shown in FIG. 21.

Each of the above-described embodiments is intended merely to clarify the technical content of the present invention. The present invention is not to be construed as limited to these specific examples, but to be construed in a broad sense, and may be practiced with various modifications within the sprit and the scope of the claims.

INDUSTRIAL APPLICABILITY

There is no particular limitation with respect to the application fields of the small zoom lens according to the present invention, and the zoom lens may be used, for example, for optical systems for use in ultrasmall three-CCDs that are used for video cameras and the like.

The invention claimed is:

1. A small zoom lens comprising:
a first lens group that comprises a lens having a negative refractive power, a lens having a positive refractive power and a lens having a positive refractive power, arranged in that order from an object side, that has a positive refractive power as a whole, and that is fixed with respect to an image plane;
a second lens group that has a negative refractive power as a whole, and that causes a zooming action when moved along an optical axis;

an aperture stop that is fixed with respect to the image plane;

a third lens group that comprises at least one aspherical surface, that comprises a meniscus negative lens whose concave surface faces the object side and a lens having a positive refractive power, arranged in that order from the object side, that has a positive or negative refractive power as a whole, and that is fixed with respect to a direction of the optical axis when zooming and when focusing; and a fourth lens group that comprises a lens having a positive refractive power, a lens having a negative refractive power and a lens having a positive refractive power, arranged in that order from the object side, that has a positive refractive power as a whole, and that moves along the optical axis such that the image plane, which is displaced by a movement of the second lens group along the optical axis and by a movement of the object, is maintained at a constant position with respect to a reference plane, wherein the following Condition (1) is satisfied:

$$4.01<|f3/f4|<60, \quad (1)$$

where f3: focal length of the third lens group,
f4: focal length of the fourth lens group.

2. The small zoom lens according to claim 1, wherein the second lens group comprises at least one aspherical surface, and comprises a meniscus negative lens whose convex surface faces the object side, a lens having a negative refractive power and a lens having a positive refractive power, arranged in that order from the object side.

3. The small zoom lens according to claim 1, wherein the third lens group satisfies the following Condition (2):

$$14<|f3/fw|<210, \quad (2)$$

where f3: focal length of the third lens group,
fw: focal length of the entire system at the wide-angle end.

4. The small zoom lens according to claim 1, wherein the third lens group satisfies the following Condition (3):

$$3<|f3/BFw|<55, \quad (3)$$

where f3: focal length of the third lens group,
BFw: back focus at the wide-angle end.

5. The small zoom lens according to claim 1, wherein the third lens group satisfies the following Condition (4):

$$0.85<|f31/f32|<1.5, \quad (4)$$

where f31: focal length of the first lens from the object side of the third lens group,
f32: focal length of the second lens from the object side of the third lens group.

6. The small zoom lens according to claim 1, wherein the third lens group satisfies the following Conditions (5) and (6):

$$|nd31-nd32|<0.15 \quad (5)$$

$$|vd31-vd32|<3.0, \quad (6)$$

where nd31: refractive index of the lens of the third lens group that is on the object side,
nd32: refractive index of the lens of the third lens group that is on the image side,
vd31: Abbe number of the lens of the third lens group that is on the object side,
vd32: Abbe number of the lens of the third lens group that is on the image side.

7. The small zoom lens according to claim 1, wherein the fourth lens group comprises at least one aspherical surface and a pair of cemented lenses.

8. The small zoom lens according to claim 1, wherein when a refractive power of the surface of the fourth lens group that is closest to the object side is $\phi 41$ and the maximum image height is RIH, the following Condition (7) is satisfied:

$$0.005<\phi 41/RIH<0.035 \quad (7).$$

9. The small zoom lens according to claim 1, wherein a single lens is disposed closest to the object side in the fourth lens group, and when a refractive power of the surface of the single lens that is on the object side is $\phi 41$ and a refractive power of the surface of the single lens that is on the image side is $\phi 42$, the following Condition (8) is satisfied:

$$0.04<(\phi 41-\phi 42)/RIH<0.06 \quad (8).$$

10. The small zoom lens according to claim 1, wherein the fourth lens group comprises a cemented lens constituted by a lens having a positive refractive power and a lens having a negative refractive power, and a single lens having a positive refractive power, arranged in that order from the object side, and when a refractive power of the surface of the cemented lens that is closest to the object side is $\phi 41$ and a refractive power of the surface of the cemented lens that is closest to the image side is $\phi 43$, the following Condition (9) is satisfied:

$$0.025<(\phi 41-\phi 43)/RIH<0.045 \quad (9).$$

11. A digital camera using the small zoom lens according to claim 1.

12. A video camera using the small zoom lens according to claim 1.

13. A camera comprising the small zoom lens according to claim 1 and an element that outputs a signal of an image formed by the small zoom lens.

* * * * *